United States Patent [19]

Frandsen

[11] 4,423,448
[45] Dec. 27, 1983

[54] MULTI-PATH TO DATA FACILITY FOR DISK DRIVE TRANSDUCER ARMS

[75] Inventor: Jorgen Frandsen, Thousand Oaks, Calif.

[73] Assignee: Burroughs Corporation, Detroit, Mich.

[21] Appl. No.: 270,653

[22] Filed: Jun. 4, 1981

Related U.S. Application Data

[60] Continuation-in-part of Ser. No. 106,847, Dec. 26, 1979, Pat. No. 4,331,990, Division of Ser. No. 85,945, Oct. 18, 1979, abandoned.

[51] Int. Cl.³ .................. G11B 5/54; G11B 21/08
[52] U.S. Cl. ......................... 360/106; 360/78; 360/97; 360/98
[58] Field of Search ............. 360/106, 47, 77–78; 310/13

[56] References Cited

U.S. PATENT DOCUMENTS 3,774,172 11/1973 Silverman ..................... 360/98
4,016,547 4/1977 Page ............................. 360/47
4,270,154 5/1981 Crawford ..................... 360/98

FOREIGN PATENT DOCUMENTS 55-123749 9/1980 Japan ........................... 360/47

Primary Examiner—Alfred H. Eddleman
Attorney, Agent, or Firm—John J. McCormack; Nathan Cass; Kevin R. Peterson

[57] ABSTRACT

An improved disk file is disclosed including multiple independent transducer/actuator arrays disposed about a common disk (stack) and adapted to afford a plurality of alternate "Data-paths" whereby (virtually any) track on any disk may be accessed for data-in/data-out using a selectible one of several "data paths".

In one type embodiment, this is implemented by switching-over between electronic-control stages when one such stage fails.

In another type embodiment, it is afforded by providing overlapping track coverage by multiple head-units. Here, for any given (pair of) disk faces, each of several actuator arrays is assigned a respective set of tracks to cover as its "primary responsibility", also being assigned another adjacent set of tracks as its "secondary" (back-up) responsibility.

Such arrangements can provide such benefits as "multiple paths to data", and can convert "Hard" failure to "Soft" failure.

18 Claims, 44 Drawing Figures

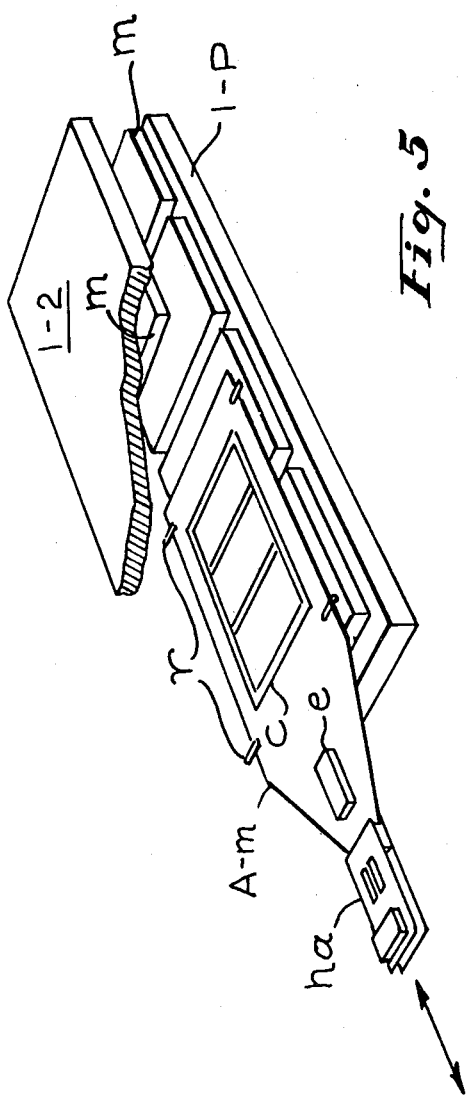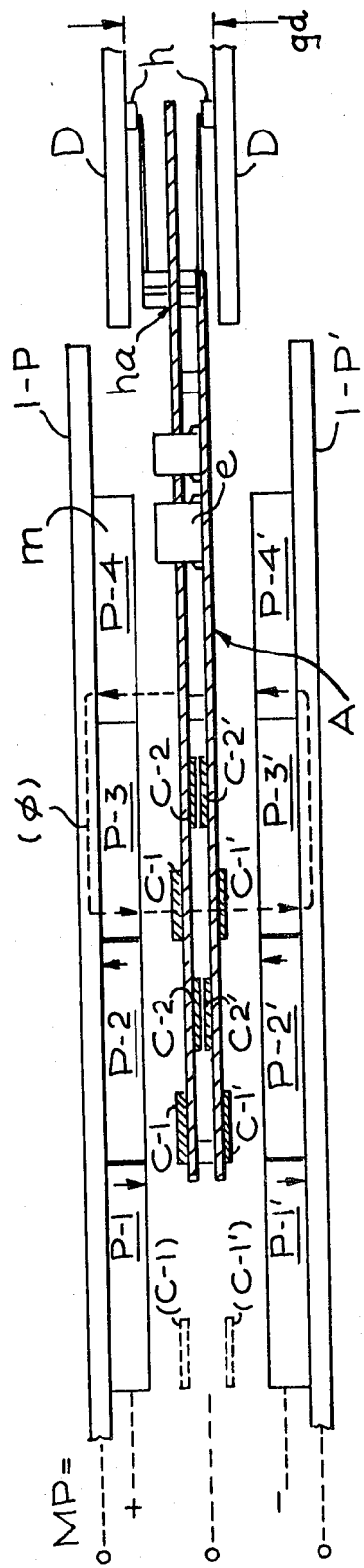
Fig. 5
Fig. 6

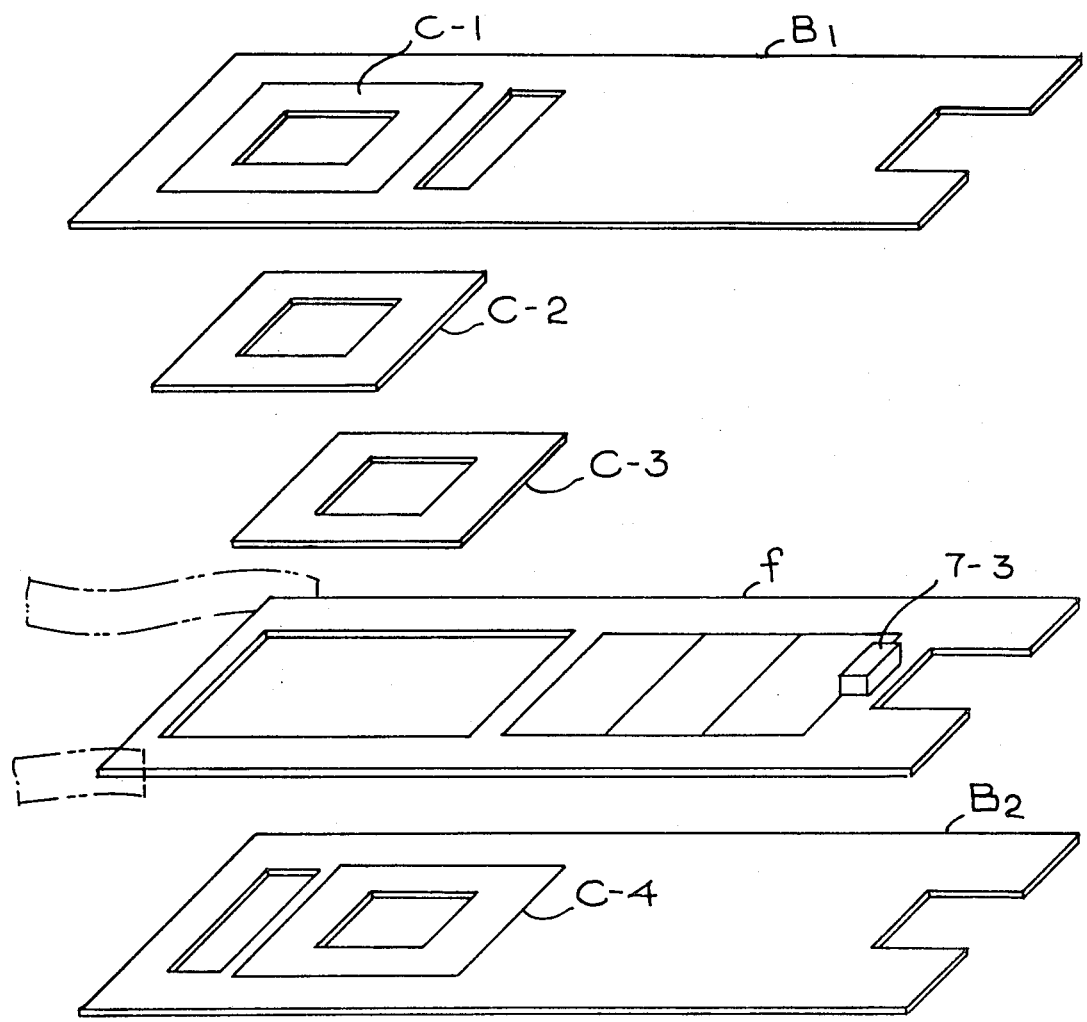
Fig. 9-A

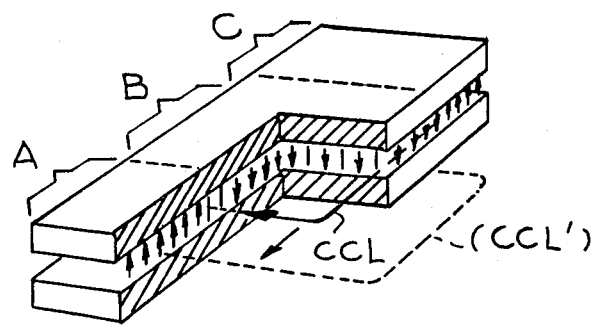
Fig. 13
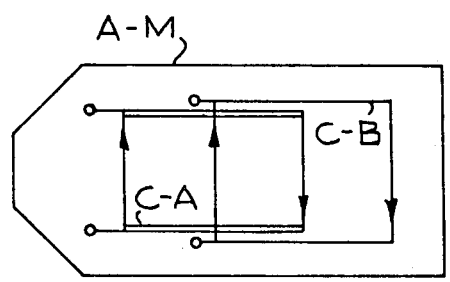
Fig. 14
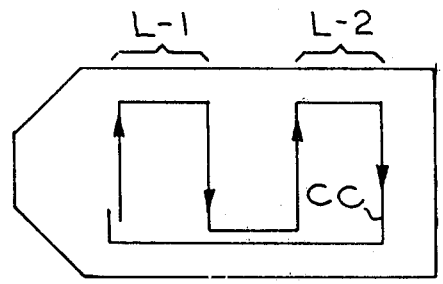
Fig. 15
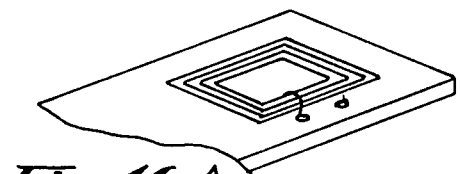
Fig. 16-A
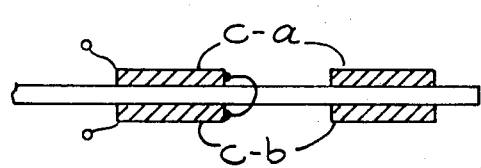
Fig. 16-A'
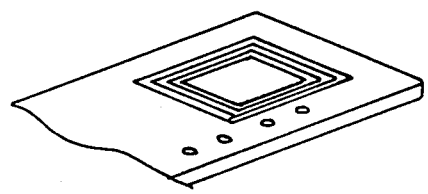
Fig. 16-B
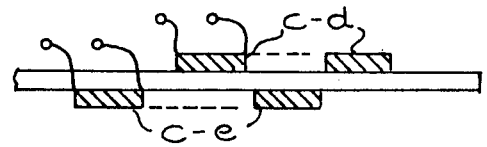
Fig. 16-B'
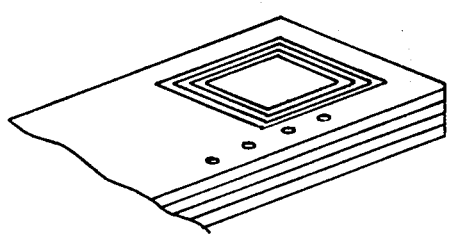
Fig. 16-C
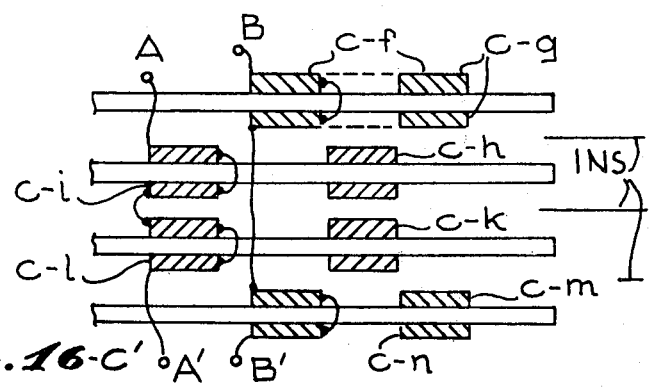
Fig. 16-C'

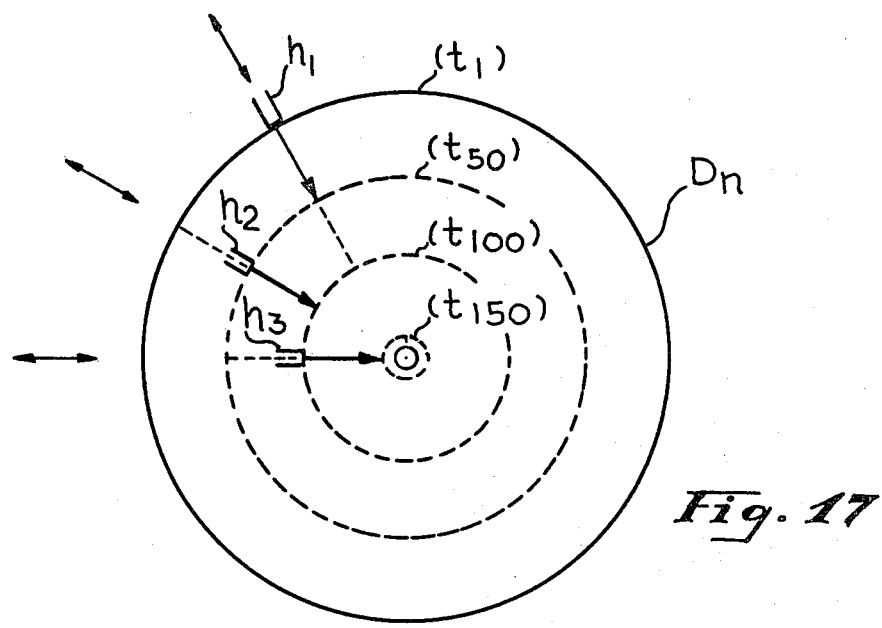
Fig. 17
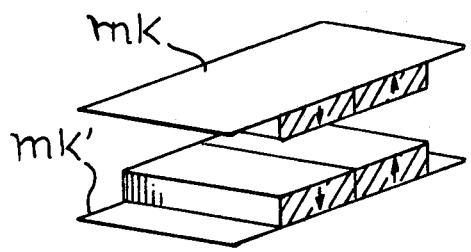
Fig. 18-A
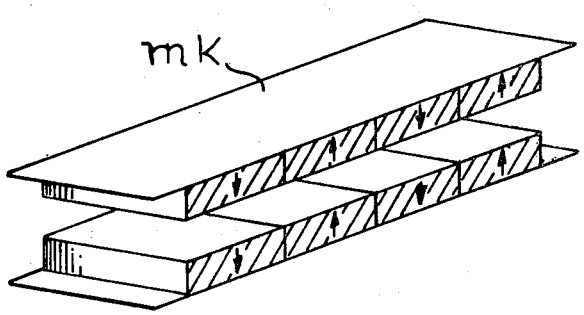
Fig. 18-B
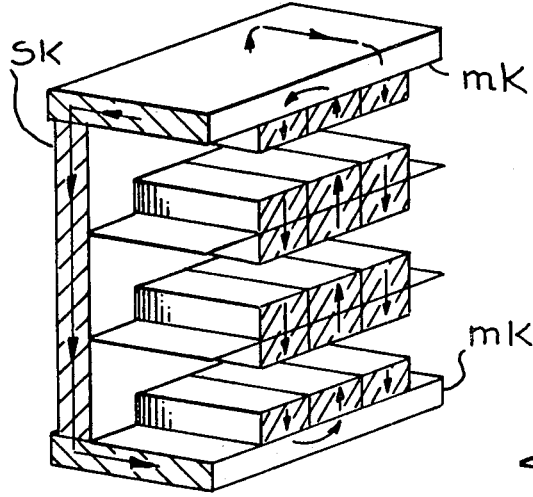
Fig. 18-C
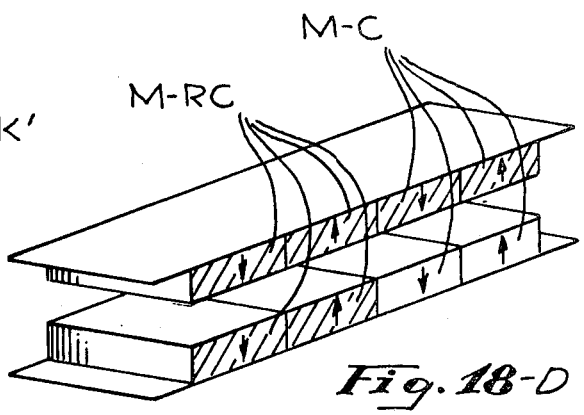
Fig. 18-D

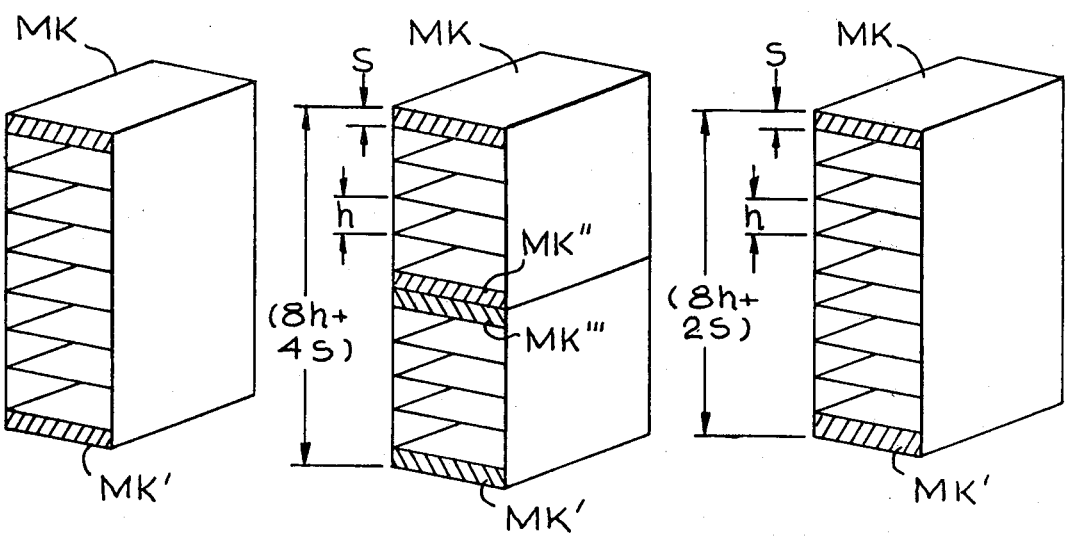
Fig. 19-A     Fig. 19-B     Fig. 19-C
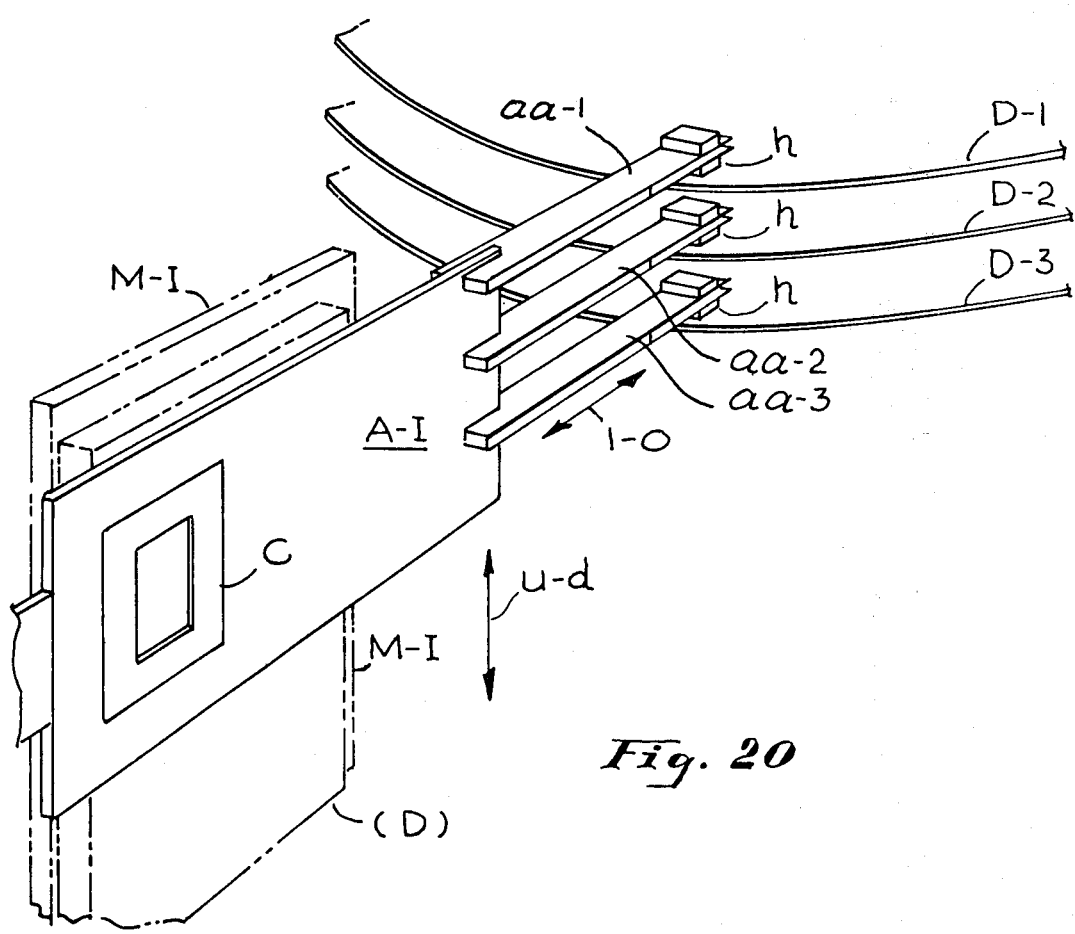
Fig. 20

MULTI-PATH TO DATA FACILITY FOR DISK DRIVE TRANSDUCER ARMS

CROSS-REFERENCE TO RELATED APPLICATIONS

This is a continuation-in-part of my copending U.S. Ser. No. 106,847, now U.S. Pat. No. 4,331,990, for Flat-Coil Linear Actuator For Multiple Transducer Arms, filed on Dec. 26, 1979; which is, in turn, a Division of my U.S. Ser. No. 085,945, now abandoned, entitled "Flat-Coil Actuator Array For Multi-Head Disk Drive" filed Oct. 18, 1979, all being assigned in common herewith and incorporated herein by this reference.

BACKGROUND, FEATURES OF INVENTION

This invention relates to novel arrangements for manipulating electromagnetic actuator systems.

Magnetic disk files for recording and storing data are widely used in data processing; e.g., as peripheral memory. Disk files have the advantage of facilitating data transfer at randomly selected address locations (tracks) and without need for the "serial seek" mode characteristic of magnetic tape memories.

As workers are aware, the transducers used in association with disk recording surfaces must be reciprocated very rapidly between selected address locations (tracks) with high precision. It will be recognized as important for such a system to move a transducer very rapidly between data locations; and to do so with high positional accuracy between closely-spaced track addresses. This constraint becomes very tricky as track density increases—as is presently the case. Typically, such disk storage systems mount the transducer head on an arm carried by a block that is supported by a carriage. This carriage is usually mounted on track ways for reciprocation by an associated transducer actuator.

Workers will recognize that the present trend is toward ever higher track density with increased storage capacity and decreased access time. Of course, as track density rises, closer control over the actuator mechanism is necessary to position transducer heads accurately over any selected track, lest signals be recorded, or read, with too much distortion, and without proper amplitude control, etc.

Known Positioners:

Such transducer actuators (linear positioners) employed with magnetic disk memory systems are subject to stringent requirements; for instance, these systems typically involve a stack of several magnetic disks, each with many hundreds of concentric recording tracks spanning a radius of about 12 inches; and a head-carrying arm is typically provided to access each pair of opposing disk surfaces. This arm will typically carry two to four heads so that it need be moved only about 3 inches (radially) to position its heads adjacent any selected track. Thus, it will be appreciated that such applications involve extreme positioning accuracy together with very high translation speeds (to minimize access time—a significant portion of which is used for head positioning). Such a positioner must move its transducer heads very rapidly so that the associated computer can process data as fast as possible—computer time being so expensive that any significant delay over an extended period (of even a fraction of a millisecond) can raise costs enormously ("transition time", during which heads are moved from track to track, is "dead time" insofar as data processing is concerned, of course). Thus, computer manufacturers typically set specifications that require such inter-track movements to take no more than a few milliseconds. Such high speed translation imposes extreme design requirements: it postulates a powerful motor of relatively low mass (including carriage weight) and low translational friction.

Another requirement for such head positioners is that they exhibit a relatively long stroke, on the order of 1-4 inches or more, in order to minimize the number of heads required per recording surface [pair].

The prior art discloses many such positioner devices, including some intended for use in magnetic disk memory systems: e.g., see U.S. Pat. Nos. 3,135,880; 3,314,057; 3,619,673; 3,922,720; 4,001,889; 4,150,407; 3,544,980; 3,646,536; 3,665,433; 3,666,977; 3,827,081; and 3,922,718 among others.

Among prior art approaches are the "Head-per-Track" approach whereby (some or all) disk faces, or pair thereof, are provided with a head which is "dedicated" to a respective track. This will be contrasted with the more usual "movable head" systems, which may be used alone, or with such a "Head-per-Track" arrangement; the latter here covering some of the tracks in some or all of the disk faces.

Workers recall that such actuator carriages are driven by various actuator mechanisms, including the well known "voice coil" motor (VCM, comprising a solenoid like those used to drive an audio speaker). Such are explained in my cited copending U.S. Ser. No. 106,847, as are various "flat-coil" actuators according to a feature hereof.

FIG. 26 shows a simplified view of a prior art disk pack D-D understood as comprising an array of like recording disks mounted to be co-rotated on a common spindle and spaced uniformly therealong, each disk having a pair of recording faces with a plurality of concentric recording track sites (tr) and being accessible by read/write transducer such as those indicated. The indicated transducers are mounted in pairs from a common axis arm with a plurality of arms projecting in common from a single transducer actuator TA adapted to reciprocate the arms in common to position one of the given heads above an associated selected track site as well known in the art.

A disk drive (DD) will be understood conventionally as a mechanism that holds several magnetic disks, keeps them spinning, and moves the read/write heads into position when information must be read from, or stored on, one of the disks. One presently popular form of DD technology, the "Winchester", is viewed as highly reliable by today's standards, yet has a mean time between failure (MTBF) of from 8,000–12,000 hours (see April 1981 Edition of Output Magazine, pages 24,25). The cited article mentions that the principle drawback for such technology (or for any form of "on-line mass memory") is "the lack of a secure backup system" raising the equation: How can a user protect against loss of (much or all of) a data base if his on-line memory is damaged by machine malfunction, by programming or operator error, by fire or any similar calamity?

It is acknowledged that the excellent MTBF's of present (Winchester) technology offers a high degree of reassurance—but it is just not high enough for many users of DD memory who are troubled by the likelihood of "Hard" failure at 8,000–12,000 hours. Thus many workers now ponder how to secure a suitable backup. One suggestion is a backup system based on floppy disks; another is based on "Streaming" tape drives (which run continuously instead of in the conventional start-stop fashion); another are data cartridges or video cassettes. All these backup systems are typically more expensive then users care to indulge these days and (e.g., in the case of floppies) will very seriously degrade the operation of the DD unit.

"Dual Path to Data" concept:

A salient feature of this invention involves modifying a typical disk drive arrangement (e.g., like that above mentioned) so as to exhibit a "dual path to data" capability, analogous to (actually) having a plurality of head-actuator units available to provide "overlapping coverage" to (some or all) of the tracks in each disk stack. Thus, for instance, with each pair of disk faces having a related pair of transducer-actuator units available to access both faces, failure of any one unit can automatically invoke the substitution of the other unit.

Similarly, each such actuator unit in the pair may include a similar control stage so that failure of one control stage can automatically invoke substitution of the other compensatorily. Thus, as further explained below, workers will appreciate that a "dual path to data" capability can be afforded either by multiple transducer actuators giving "overlapping coverage" or by multiple actuator controls which are "cross-switchable", or both implementations where feasible. It is an object to teach this.

"Cross-switchable" actuator controls:

For a simplistic showing of such a multiple actuator control arrangement please note FIGS. 21, 22 and 23, (described below in detail) where failure of one control unit is understood to automatically invoke a "substitution sequence" calling in the companion control unit and thus keeping the system "on the air".

"Overlapping-coverage" by multiple transducer units:

FIGS. 1A and 24 (described below in detail) schematically indicate the other approach whereby (selected) record faces are given "overlapping coverage" by a plurality (two are shown) of transducer actuator arrays, and to be cooperatively controlled and manipulated to afford such a "dual path to data" feature. That is, if one actuator unit fails, its companion unit may be called in to "cover" for it (i.e. to service the tracks primarily assigned to the failed unit).

Vulnerability to failure of typical disk drive; (FIG. 25):

Workers in the art of designing, making and/or using EDP systems are acutely sensitive to the problem of "catastrophic system failure" or "Hard" failure, where for some reason an entire EDP system or subsystem becomes essentially inoperative for a significant time. While an entire system is thus "off the air" some very bad things begin to happen: People in the user establishment typically rely very heavily on the EDP system (and it is typically too expensive to afford redundancy whereby a "standby system" is available for substitution—except in the case of a few ultra-large installations). Extreme pressure is brought to bear on the user's people every second the system is "down".

These people in turn very quickly make the system's vendor (sales people, leasing agent and associated manufacturing people) acutely aware of how unpleasant their life has suddenly become. A parallel pressure is applied to the purveyor's management because of the loss of leasing revenue or the possibility of a system "return", loss of future sales, etc. Thus everyone concerned with an EDP system will go to enormous lengths to keep it "on the air", even if this means it might "limp along" for a time at reduced effectiveness (e.g., operating at reduced speed) this being known in the art as "Soft" failure.

Now the disk drive (DD) components in such an EDP system are typically the most critical (present the greatest risk) viz a viz such a "Hard" failure of the entire system. This is because a DD unit is so used that it is usually "ON-Line" and it is not feasible to "bypass" it if it fails (unlike other different components, such as tape drives, card readers or printers, etc., which can themselves "go down" without dragging the whole EDP system down with them—this is partly because such input and output devices do not typically operate "on-line" with the CPU and in "real time", whereas a DD unit often does; thus if such off-line I/O unit fails, the system CPU may "busy itself", at least temporarily, by turning to other tasks; but this is not possible with a DD which typically may be the only "data-bridge" between the CPU and the outside world, spending much of its operating life linked "on-line" into the "data-paths" of the CPU while the CPU is manipulating and temporarily storing data; thus "Hard" failure of the DD unit by analogy "blows a fuse" in the on-line "data-path" of the CPU and so shuts down the entire system).

Illustrative processing cycle of an EDP system, DD failure:

An illustration may help clarify things. FIG. 25 is intended to very schematically and functionally depict such a typical EDP system with a pair of host central processors (CUP-1,-2) surrounded by clusters of servient peripheral units such as the array of card readers, CR, the array of cathod ray terminals CRT (typically with a keyboard for communicating to a CPU) an array of high speed printer units, PR, an array of tape drives, T, an array of Key-to-tape units KT, an array of optical reader units RP, an array of phone line connections, or modems, TM, and several disk drive units DD. The system is very sketchily shown, of course, but it will be understood as operating according to present good state-of-the-art practice.

Briefly recounting a typical operating day for this EDP system in FIG. 25 may be instructive, assuming the system is used in a large commercial bank, for example. During business hours, system operators will typically keep the CPUs busy, e.g., access either to provide current business information to management or to customers such as a daily summary of the latest status of bank finances and those of major customers or similar summary reports to large customers on the state of their accounts (e.g., to minimize their "float" and maximize profits on the use of their money). Also they may answer specific real-time queries of bank management or customers (e.g., a new customer wants a very large loan for 10 days: Can the bank swing it?—or the creditor of a customer inquires after his credit status, payment record, etc.). For instance, in a time-sharing mode, the two CP units might be capable of handling questions from 10 CRT units and several modem terminals, while also plugging-in and -out with one of the DD units in the course of answering questions and manipulating data. During the day company business and customer account changes typically involve a massive real time traffic demands on the system.

For this reason other, less pressing tasks are deferred; e.g., such tasks as updating accounts, receiving reports from satellite bank branches reconciling debits and credits for the whole bank network to arrive at an accurate overall balance. These tasks are relegated to the non-business hours (e.g., late evening) when the CP units are not otherwise busy—then the CP may attend to these and other "housekeeping" duties.

Thus, during the evening, input is received from branch banks and customers, etc.; e.g., being provided through the telephone modem units (perhaps being stored temporarily on a DD for fast transmission off the wire, then later dumped at a slower rate into tape drive units). Night workers may feed in results from the day's mail and from the day's transaction receipts (e.g., via card reader units CR or Key-to-tape) and these may be fed to similar slow-speed archival memory (tape drive). The CP units may then, in their own good time, call-up such input data once it has been fully received, organized and stored in local memory, doing this at the usual fast efficient rate (e.g., when the CP is ready to summarize the day's transactions or to begin updating customer accounts, etc.). Just before this, it will direct the appropriate tape drive to make a memory dump to a specific DD, the CPU keeping busy meanwhile on other things during the slow-speed dump—and later turning to the DD for high-speed data interchange in "real time". As workers know, it is more efficient for a CP to talk to a DD with the usual "fast data rate" then to a much slower, serially-organized tape drive—hence the TD uses the DD as its "middleman".

In this manner, all the input data for the previous business day may be digested and stored in the system, with accounts reconciled and status reports prepared (printed) prior to the beginning of the next day's business day.

Workers will recognize that in all these typical system operations the DD is the only peripheral unit that is so co-operative with the CP units operation in real time that it can actually "pull down" the CPU if it fails. That is, if a CP unit is working on a given block of data temporarily stored on a given DD and the DD fails during some manipulating sequence (e.g., while figuring a certain payroll—with all the hours, rates, latest deductions, etc., etc., stored on the DD for real-time use by the CP) this DD-failure will typically block further operation (on this sequence at least) by the CP. Of course in certain instances it may be possible for the CP to abort the entire sequence and start anew with a second DD unit, but this would mean an extravagant waste of time and money and few operations allow for this.

Objects:

Thus, I have discovered that preventing "Hard failure" of a DD unit is especially critical to operation of an entire EDP system. (Presently workers say that DD failure accounts for almost all of the urgent service calls to an EDP site). Accordingly, by this invention, I have addressed the problem of DD Hard failure and attempted to ameliorate this, converting it to a "Soft" failure to the obvious benefit of an entire associated EDP system.

I have learned that DD failure is very often due to failure of a motor; less often because of a head crash; even less often due to failure of the actuator or the head electronics, (as workers know, once any head impacts a disk in a typical fixed DD all the other heads will "crash" against their confronting disk, gouging the disk and themselves, and of course destroying data in the process). Indeed I have found that the DD units are the most prone to serious failure of a type which interrupts the overall EDP system and "brings it down", resulting in expensive down-time and service calls. Here, I address the problem of DD failure and associated blockage of a "DP path" in an EDP system, and attempt to alleviate this by providing for "soft-failure" of a DD unit via a "multi-path to data" capability. That is, this approach focuses on the criticality of head-actuator units and provides "alternate paths to data", at least for all critical tracks in a disk file. A preferred way is to do so by providing alternative modes of "soft-failure" for the head actuator portions of a disk file.

One preferred soft failure results from providing a novel "cross-bar" arrangement between a plurality of like head actuator arrays serving a common disk file whereby the electronic-control stage for each array is connected to be "cross-coupled" to one or several other arrays for emergency servicing thereof.

"Soft-failure": is also here taught as implemented by providing a plurality of head-actuator units for all (critical) tracks, these units having a capability for overlapping track coverage, in case of emergency. That is, this "multi-path to data" approach provides two or more transducer units for each recording disk face, or pair of faces. The above mentioned flat coil actuator design will be seen to facilitate this. This may be optimized by apportioning transducer coverage across each given disk face and providing for "emergency mode" overlapping coverage by adjacent transducer units.

Multiple overlapping transducer coverage; Ex. I:

An Example of this multiple overlapping transducer coverage may be understood as follows with a given conventional Fixed Disk Drive with the disk file thereof presenting like disk recording faces, each with 1,000 tracks and with three (3) associated transducer arrays: array i, array ii and array iii. Each array is conventionally adapted to be translated radially to a selected track in its associated track set. Array i is assigned to normally cover a first group of tracks, namely outermost tracks 1–100, these being the most frequently used; array ii is assigned to normally cover tracks 101–300, the next most "popular" tracks; array iii is assigned to cover the rest: namely tracks 301–1000. Each transducer array will, according to this invention, be adapted to also cover the adjacent track span in a prescribed "emergency mode" of operation. In this emergency mode, for example, if transducer array i fails for any reason, the adjacent array ii can be (automatically) thrown into emergency mode and operated to cover the tracks of array i (i.e., tracks 1–100) as well as its regularly assigned span.

Similarly, if the array ii goes down, either adjacent array i and/or array iii can be thrown into emergency mode to cover its track span (#101–300) and so forth. This characterizes this kind of "Soft failure" capability (as well as a "multi-path to data" or "overlapping transducer coverage") since the failure of any one transducer array does not cause catastrophic failure of the DD unit or of the associated EDP system. Rather it merely throws the DD into an emergency mode which will characteristically operate a bit slower and less efficiently but nonetheless keep the entire EDP system "on the air"—something very desparately desired in the art now as workers know.

Similarly, in certain operating modes, such a "multiple overlapping transducer coverage" can be advantageously used in regular, non-emergency operations. For instance, to reduce access time and improve DD performance. That is, the hardware and software can be arranged in such a DD so that while any one transducer array (array i) is operating on a given assigned track (e.g., #11) and where the "next track up" (e.g., #91) happens to lie in the same span of tracks (e.g., #1–100) covered by this "busy" array, the system will turn to the adjacent transducer (array ii) invoking an "assist mode" and, translating it to that track, to service it as soon as the first array i is finished (with track #11; e.g., while the "busy" transducer i is awaiting completion of a disk revolution, as it sometimes must). This second transducer will now be used, rather than the first, to operate on this "next-up" track. Workers in the art will appreciate how such multiple track coverage and how such anticipation of "translation time" can reduce access time, since translation time is the biggest obstacle to fast access in a DD unit. Other variants of this "assist mode" and overlapping transducer coverage will be appreciated by those skilled in the art.

"Cross-bar" feature:

Another related implementation of the "multi-path to data" capability involves such a system having a plurality of transducers per disk file (stack), each with associated control means, wherein a control means for one transducer unit may be switched to operate another unit in the file—e.g., where one control unit fails, the associated transducer may still be operated (albeit somewhat slower) perhaps while awaiting field repair; the system thus going "fail-soft" and not going down completely! To this end the control means are inter-coupled with "cross-bar" means allowing them to be so switched.

Workers will see that this implementation can even be used to dispense with the abovementioned redundant transducer coverage or overlapping transducers while yet keeping many of its salient advantages. That is, it may be preferable to use the overlapping multiple transducer feature together with this "cross-bar" coupling control unit;—however, it will be apparent that for a cost-reduced DD one may dispense with the overlapping, while yet still achieving "Soft-failure" and multi-path to data capability by just cross-coupling the actuator control units, (for instance, as indicated in FIG. 23, further described below). With this feature, the DD will "Fail-soft" and keep the system on the air when one of several head actuator control units fails. Of course, this "cross-coupling" of control stages (cross-bar feature) is preferably used together with the multiple actuator per face implementation for a more comprehensive fail-soft capability.

Thus, one object of this invention is to provide the mentioned and other features and advantages. A related object is to do so providing a "multi-path to data" capability in a disk drive, converting "Hard" failure thereof to "Soft" failure. A related object is to do this using "cross-coupling" of actuator control stages. Another object is to do so providing multiple-transducer per track capability. Yet a further object is to teach the use of such modules with independent multiple transducer control whereby transducers can be operated independent and in parallel (e.g., one engaged in "read/write" while one or several others are "seeking" their next read/write address; or some heads positioned over oft-used tracks while others "seek" randomly).

Another object is to do so providing "multiple paths to data" (multi-port flexibility), with multiple transducer assemblies arranged to cover the same addresses, at least in "emergency mode" (and/or in an "assist mode").

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIG. 5 shows an upper perspective view of one actuator embodiment of the type referenced above; while FIG. 6 shows the assembly in side sectional view;

FIG. 7 shows a single actuator of the type in FIGS. 5 and 6, as mounted for rolling reciprocation, while

FIG. 9AA is a functional plan view showing of a typical coil for such an actuator and FIG. 9AB is a schematic side view of such an actuator in the manner of FIG. 6;

FIG. 11 is a very schematic side section of a prior art "voice coil" type actuator shown in FIG. 12 in partial end perspective; while FIG. 13 is a like view of related portions of a "flat coil" actuator according to the invention;

FIG. 14 is a very schematic plan view of a flat actuator according to the invention to functionally indicate current polarity; with an alternate coil arrangement being shown in FIG. 15 and with related differently-connected coil arrays being shown in partial perspective and side view in related FIGS. 16A/16A'; 16B/16B' and 16C/16C';

FIG. 17 is a very schematic plan view of a magnetic recording disk with a functional indication of an "overlapping head"-track coverage technique useful with the present invention;

FIGS. 18A through 18D show, after the manner of FIG. 5B different arrays of permanent magnets varied in both the horizontal and vertical direction;

FIGS. 19A through 19C show variations, after the manner of FIG. 1B, of differently arranged stacks of actuator compartments;

FIG. 20 is a side schematic perspective of a modification of the present flat coil actuator used to drive a plurality of positioner arms rather than a single arm as in the prior embodiments;

FIG. 21 is a simplified partial elevation of a portion of a fixed disk file accessed by a pair of head actuator units, while

DESCRIPTION OF PREFERRED EMBODIMENTS

Figure 1A:
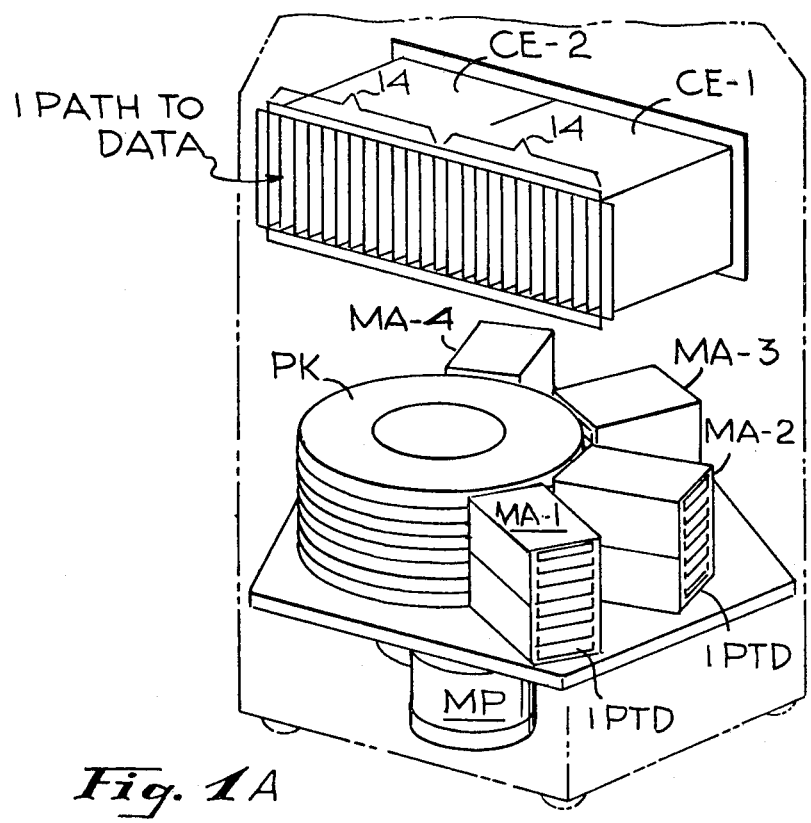
FIG. 1A is a perspective schematic partial view of an improved disk drive embodiment with several multi-actuator module embodiments, these shown in partly-disassembled perspective view in FIG. 1B and in a functional side section in FIG. 2, and very schematically in the front perspective in FIG. 3 and the rear perspective in FIG. 4.
Figure 1B:
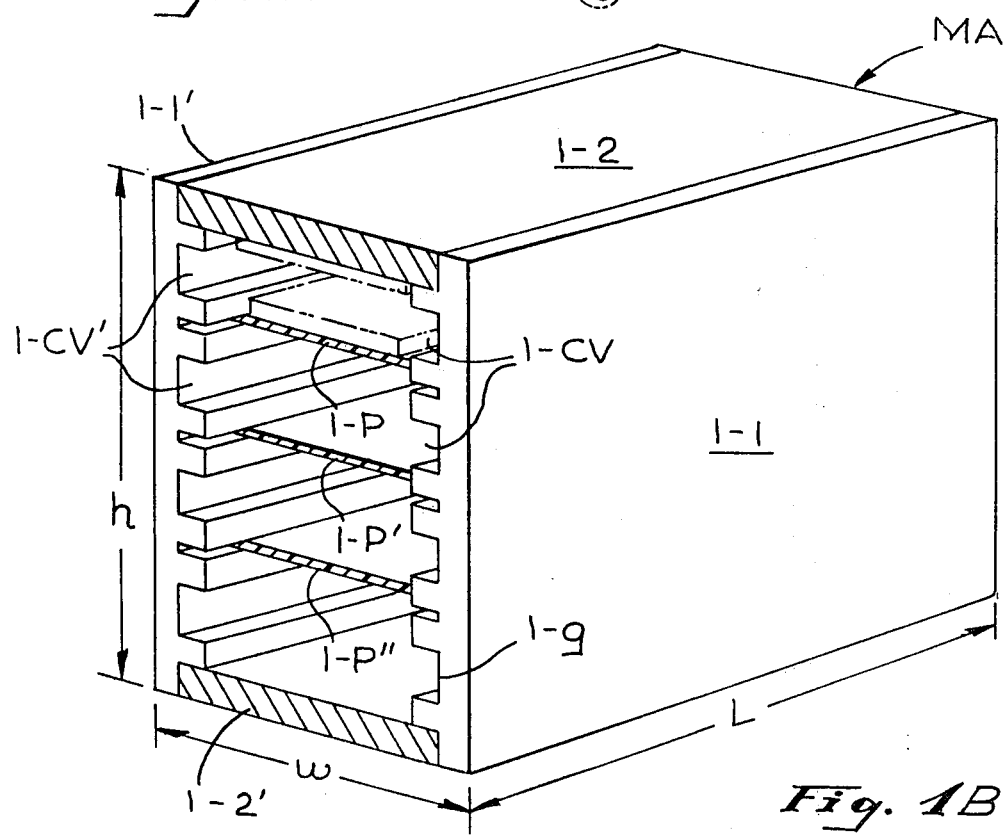

FIG. 1B is an idealized perspective view of salient portions of a novel "dual-path" disk drive comprising a rotatable multi-disk pack Pk arranged to be controllably rotated, e.g., by motor $m_p$, and otherwise operated relatively conventionally, except that it is operatively associated with a plurality of like actuator modules MA to be described hereafter. According to one feature hereof, this arrangement comprises a first stack of actuators MA-1 comprising 16 identical stacked actuators ("odd gap" stack) each designed to service one of the odd-numbered gaps in the 64 disk stack Pk, while a like "even stack" MA-2 comprises similar array of actuators, each designed to service one of the even-numbered gaps. Workers will appreciate that, here, two stacks rather than one are shown; this illustrating a feature of convenience with the invention. That is, rather than being stacked in a single vertical array, the flat coil actuators according to the invention are preferably broken up and organized into two stacks (as here) or into four stacks, etc., etc., as one may prefer.

According to a related feature, each of these stacks MA-1, MA-2 is replicated in a second set: "even stack" MA-3 and second "odd stack" MA-4, these equivalent to MA-1, MA-2, respectively, except that where the first two stacks cover the outer disk tracks principally, the second stack pair are designed to cover the inner (half of the) disk tracks. As a supplemental feature, all stacks preferably have a secondary ("backup") capability to service the entire track array (e.g., in case a companion actuator is disabled or otherwise occupied).

Figure 2:
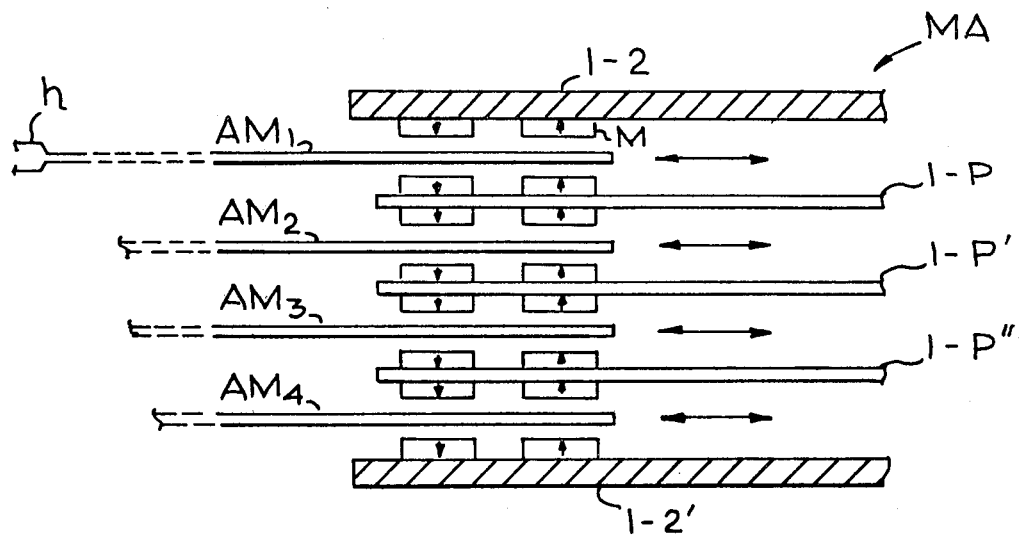
Figure 3:
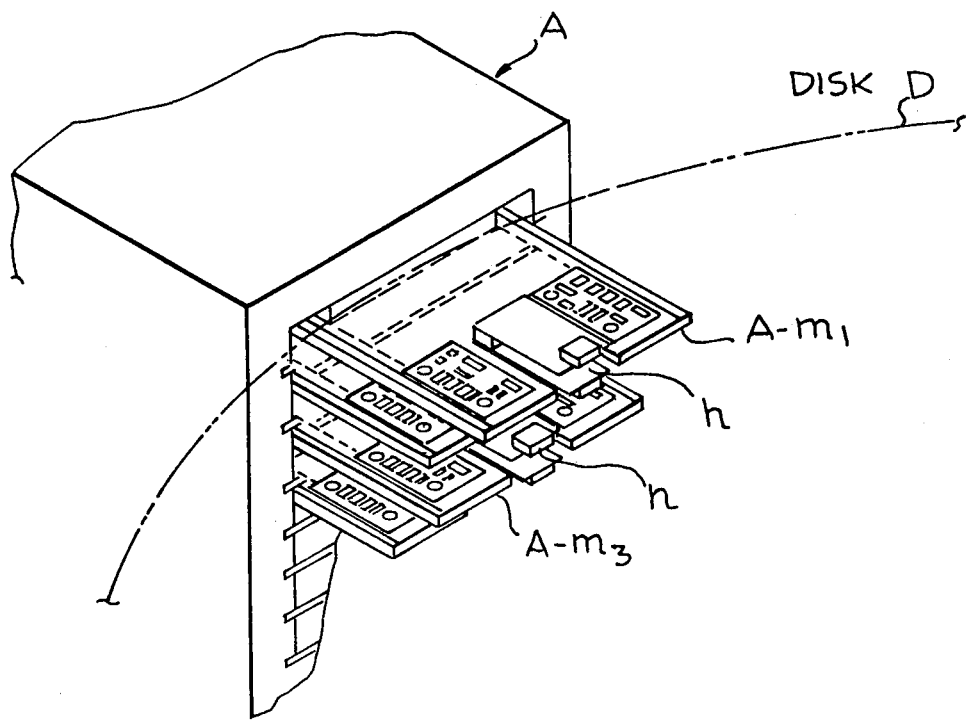

Attention is directed to FIGS. 1B–8 (especially FIGS. 3 and 4) where a single one of the actuator assemblies MA according to the invention, is shown. Each stack MA is arranged to provide a stacked module, or array of actuators and associated magnets and to provide positioner arm means for an associated set of transducer heads. Each stack MA will be understood as comprising a prescribed number of independent actuator strips A-m stacked vertically, each being adapted to be reciprocated along a prescribed carriage-way between a respective array of opposed permanent magnet pairs (see magnets m, FIG. 2) to position associated transducer means in a respective inter-disk gap. In FIG. 3, four illustrative actuator strips A-m1 to A-m4 are shown by way of example, with their forward, transducer-carrying ends adapted to project respective heads h into the disk stack (indicated in phantom and well known in the art).

Figure 7:
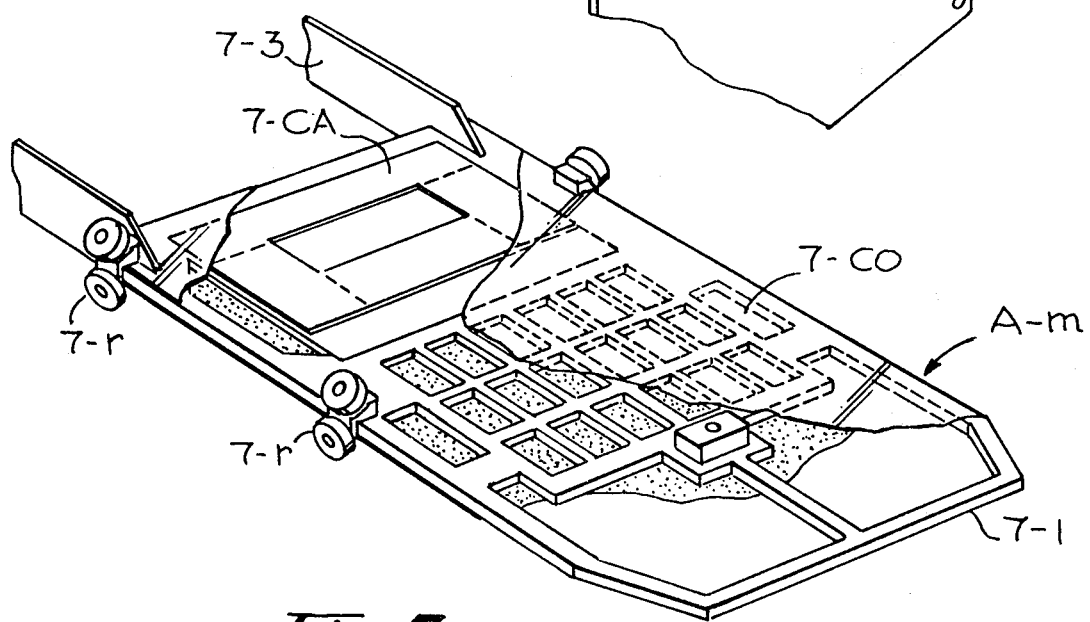
Figure 8:
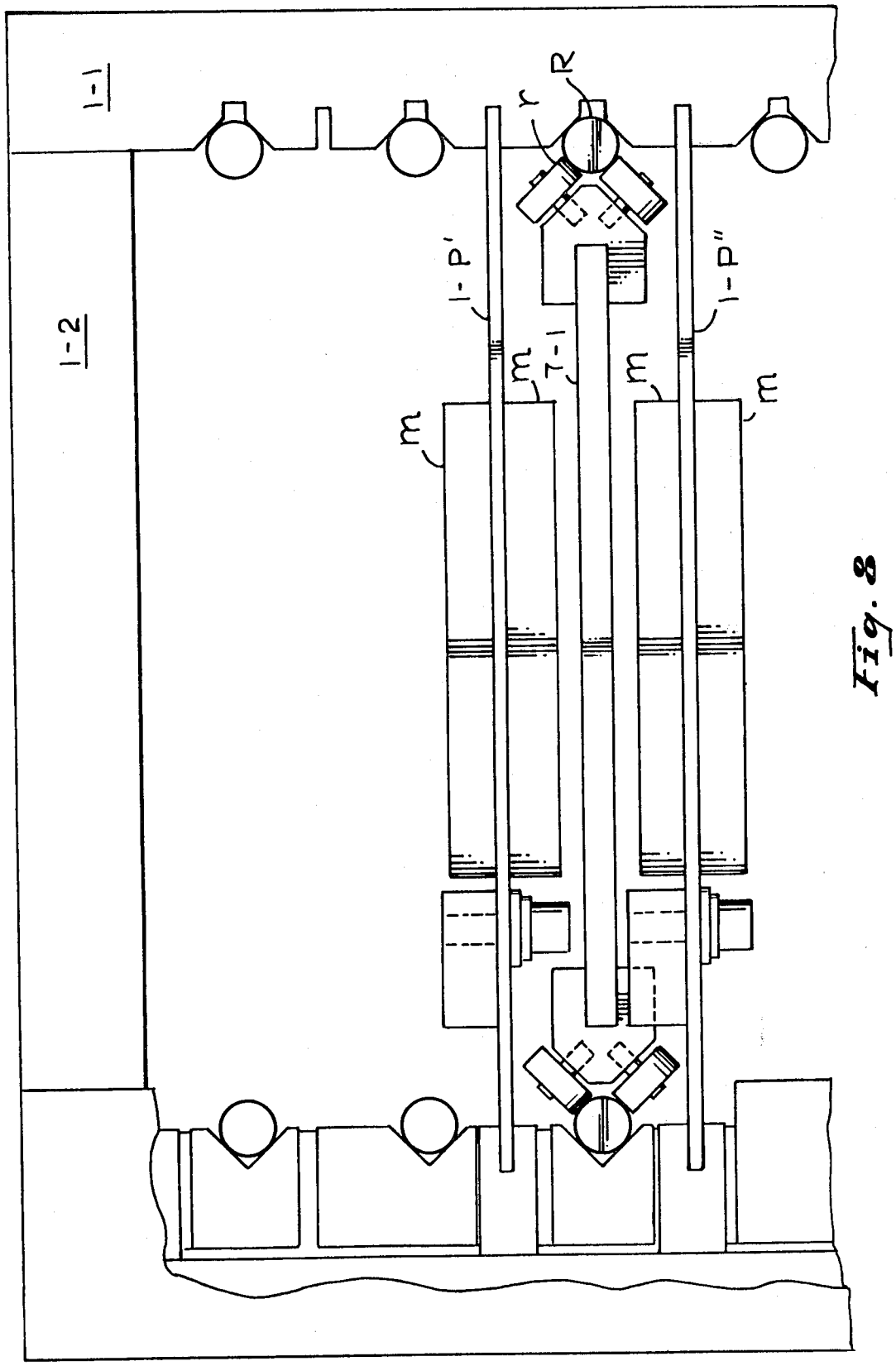
FIG. 8 shows this in frontal section and FIG. 9A shows individual actuator elements exploded-away vertically, these elements being separately shown in FIGS. 9B, 9C, 9D, 9E and 9F.

FIGS. 7 and 8 give a perspective view of a preferred embodiment of "flat coil" linear positioner A-m in accordance with this invention. Such an embodiment can be considered as comprised of two primary assemblies: the mobile armature-carriage assembly A-c essentially including the flat coils, head mount, roller bearing and support means; plus the fixed housing and permanent magnet structure A-g with the magnet shunts, sides, etc.

As shown in the drawings for purposes of illustration, the invention is to be understood as incorporated in a magnetic disk memory system, including a plurality of disks D in a conventional stacked array Pk, arranged in vertical spaced relation with a related stacked array of head assemblies h. Each head assembly h is mounted at the distal end of an armature carriage A-m to be reciprocated back and forth in its disk-gap relative to a respective pair of magnetic recording disk surfaces.

With selective positioning of each head assembly in a conventional manner, the "flat armature" (coil) means provided according to the invention, may be electrically energized to move into a retracted or extended position as known in the art (relative to the associated pair of disk surfaces) and read or record information on any selected track thereof. Thus, the head assemblies h are supported in pairs on actuator strip A-m, to be projected in cantilever fashion as part of a rolling carriage supported by rollers r and movable along track rails R. The reciprocating actuator assembly A-m, carrying coil C, is operable when coil C is current-energized in a conventional manner, to move the carriage along the associated cavity, toward and away from the disk stack between a plurality of precisely located addresses, these addresses, or track positions, determine the position of heads within the stack in the known manner.

Figure 4:
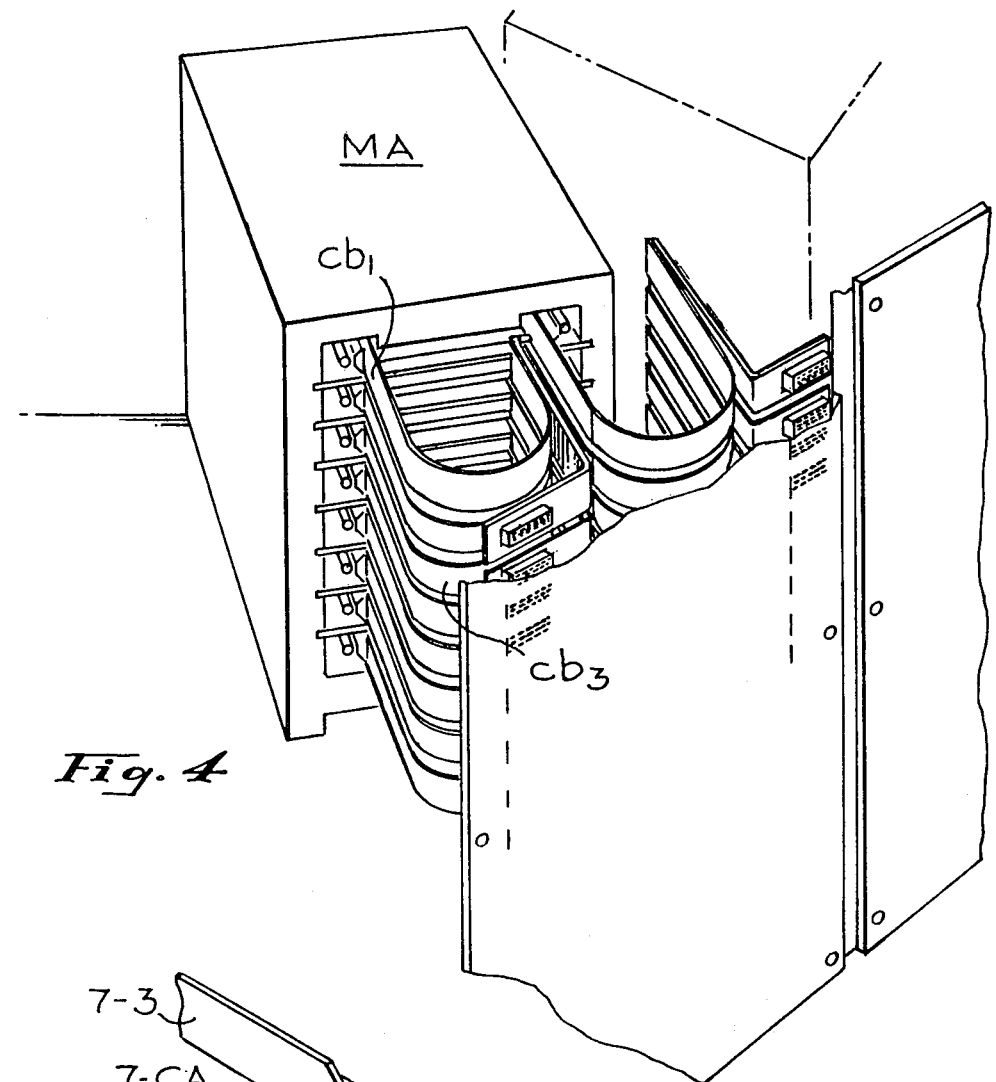

FIG. 4 indicates the opposite (rear) end of the actuators including their flexible connector (head cable) means CB-1, etc., and associated connections, these being provided conventionally and as known in the art.

For illustration purposes, one such actuator assembly module MA is indicated schematically in FIG. 1A where, for simplicity of illustration, the actuator strips, associated permanent magnets m, etc., are removed, except for magnets m shown in phantom. Actuator array MA is arranged according to the invention to house a prescribed number of identical stacked actuator assemblies (here, four places shown, each assembly being separated by a prescribed metal shield-support or partition 1-p, 1-p', 1-p"). Array MA is peripherally defined by a pair of metal sides 1-1, 1-1' connected and closed by a pair of (upper and lower) magnetic shunt plates (1-2, 1-2', respectively). Shunts 1-2, 1-2' are preferably comprised of cold rolled steel or other low reluctance material so as to offer a low resistance magnetic (shunt) return path for actuator flux.

The inner portions of sides 1-1, 1-1' are cut-out to form slots 1-cv, etc., or elongate linear grooves for receiving guide rails (see rails R in FIG. 8); these rails, in turn, to be engaged by a respective pair of roller assemblies r projecting from frame A-m—as indicated in more detail in the sectional view of FIG. 8, and the perspective of FIG. 7, for instance. The structure MA is preferably formed in a standard module with a prescribed standard height, width and length (h,w,l, respectively), such that these actuators may be stacked vertically. Thus, where a larger array of actuators is desired, the appropriate number of such modules may be added on, being stacked adjacent their associated gaps, (the number of compartments per stage is optional).

As detailed in FIGS. 5, 6 and 7, each actuator strip A-m includes two double roller assemblies r on each side thereof (or two such opposed by a single third roller as an option, see FIG. 7). These dual-opposed wheels are adapted, as known in the art, to engage a respective guide rail R as indicated in FIG. 8, in rolling contact when the assembly A-m is translated along its elongate axis (in moving head assembly h relative to track addresses on a respective pair of disks D as well known in the art). Each actuator strip A-m is adapted to be so-reciprocated along a respective actuator cavity between opposed sets of permanent magnet poles m (here, four such pole pairs are shown in FIG. 6A at P-1/P-1'; P-2/P-2'; P-3/P-3'; P-4/P-4'; see also FIG. 2 where four such actuator strips A-m1 through A-m4 are illustrated schematically as apt for reciprocation, when energized, along the strip's axis and between opposed sets of pole pairs).

FIGS. 5–7 also illustrate details of such a flat coil actuator strip A-m where, according to various further features of novelty, the strip is formed into a relatively thin, light-weight, planar body and is adapted to receive flat coil windings; (—preferably as a printed circuit board PCB, with two or more flat, overlapped coils C printed thereon). Electronic circuit means e is also preferably mounted on each strip A-m at the designer's option, (e.g., read/write electronics for the associated actuator).

Such a "flat armature" A-m will be understood to comprise a "planar trolley" carrying read/write heads h at its distal end and mounted on bearings to be reciprocated freely along a track between upper and lower relatively flat opposing pole pairs. The arrangment of magnets and housing, including magnetic shunts 1-2, 1-2' will be understood as forming a "closed" flux loop (return path) as mentioned, with flux direction as indicated in dotted line $\phi$. Here, as opposed to a VC motor, the flux return path will be seen as "contained" (not "uncontained" or substantially in-air, as with a VC motor), lying principally across the working gap, so that return flux participates as working flux. This design dispenses with the tubular bobbin and helical coils of a VCM—in favor of the flat mandrel or support on which the several flat conductor loops are placed. These loops will comprise one or several turns (preferably eight coils of eleven turns each and staggered with a 0.625" pitch, as indicated in FIGS. 9A–9F—these loops comprising a moving coil through which the activating current passes to generate the "working flux" which moves the unit.

Workers will be surprised how thin such an actuator can be (e.g., a thickness of about ¾" is readily achieved using 1/16" PC board with copper cladding plus ⅛" thick magnets on 1/16" sheet steel, leaving an air gap of about 0.1").

The operation of such a novel, "flat coil" ("flat armature") actuator will be apparent to those skilled in the art; that is, the motor or linear positioner so formed will be understood as comprised of four flat plates (PC boards) supporting eight flat overlapped coils C with the head h and associated electronics e mounted at the front end of board A-m, and with bearings and associated rollers supporting the board edge for movement along respective rails. In operation, only one of the two overlapped coil-sets is energized at one time. Each coil set, when current is applied, interacts with four adjacent surrounding magnets (of the eight-magnet assembly see also FIG. 9AB). The magnets provide alternating flux in the air gap between themselves and the coil turns, such that a coil's "front" wire experiences flux that is directed oppositely to that experienced by its "back" wire. Thus, as the coil moves it will reach the boundaries of the flux area covered by these four driving magnets—at which time the second coil is enabled and takes over using the same four magnets. This action will be understood as providing a capability for "stepping" the flat coil actuator through the magnet assembly while still keeping a "linear region" associated with each step (Note: when such a coil is energized it moves in some direction until it reaches a "magnetic boundary"; then if the current is reversed, the coil moves in the opposite direction until reaching another "magnetic boundary"—the distance between these boundaries is the "linear mode region").

Workers will appreciate how compact, light and advantageous such a staggered multi-turn actuator coil array can be. For instance, as provided for a typical stack of magnetic recording disks, each such actuator would service the gap between associated disks; while stacked sets of such actuators will be grouped in modules wherein a common magnetic housing and circuit is provided (between shunts 1-2, 1-2', for instance, as noted in FIG. 1A, etc.).

Thus, for a typical disk stack with a typical inter-disk spacing or gap $g_d$ (see FIG. 6) of about ⅜" and with one such "flat-coil" actuator arrangement servicing each inter-disk spacing, the performance and dimensional constraints for practical, optimal head translation are readily accommodated. (E.g., in one embodiment using 1/16" PC board with 20 mil copper clad coils, and assuming inner gap clearance of about 1/10" inch, fast translation was seen.—Note above that the magnet poles P may, for instance, be formed of one-half inch thick ferrite, having a permeance coefficient of about 2.8; while shunts 1-2, 1-2' can be ⅜" cold rolled steel, with supporting plates 1-p, etc., comprising non-magnetic 1/16" steel sheet). The coils are preferably "overlapped" as illustrated.

With rare earth-cobalt magnets in such an array (90 gm. actuator) and with a gap flux of about 4 kilogauss, a very surprisingly low leakage has been observed (e.g., about 5 gauss at ¾" vs. ordinary VC motor similarly used: 5 gauss at about 7"). Also, the excursion characteristics are surprisingly "flat". Preferably, the coils are "reverse-wound" and connected at centers (see below). The flux loops (see $\phi$) will be observed as nicely "contained" between adjacent opposed-polarity magnets (e.g., P-3, P-3'; P-4, P-4' shown) and the magnetic keepers or end plates 1-p, 1-p'. Thus, the magnetic potential (M.P.) as shown will be zero at the top, bottom and center of the array (FIG. 6A).

The working excursion of this actuator (FIG. 6A) should be viewed as:

1: from extreme left (c-1, c-1' in phantom) across P-1/P-1' to P-2/P-2' with coils c-1, c-1' working;
2: then, as coils c-2, c-2' (oppositely poled from c-1, c-1') start to sweep across P-2/P-2'-P-3/P-3'

Except as particularized, workers will understand that the foregoing elements are constructed and operated as known in the art (e.g., as specified in the cited references). Workers may be surprised to learn that embodiments like that here indicated have involved a total moving mass of only about 90 grams—this comprising the actuator strip, or PC board, pair of head assemblies, and pair of R/W integrated circuits, along with the four sets of double bearings, or rollers—a surprising low mass!

Figure 11:
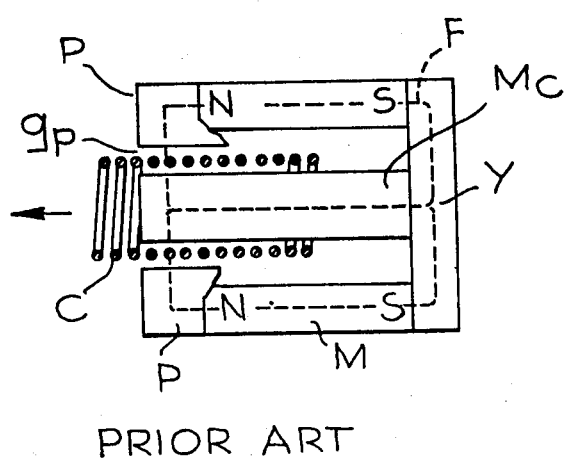

It will be apparent to workers how such a "flat armature" linear positioner simplifies the moving coil structure, compressing it and flattening it out, as well as making it possible to greatly reduce mass and volume. (E.g., as compared to a VC motor with its "open" (air traversing) flux. path; see FIG. 11).

Such a "flat coil" actuator will also be seen as allowing for a relatively unlimited stroke length (according to the number of magnets strung out) this facilitating radical miniaturization and compression of the actuator stack (and thus allowing one simplified actuator between each pair of recording disk surfaces—i.e. per gap—according to a related feature)—the flat shape facilitating the close and intimate stacking of actuators in a rather surprising novel manner.

—One plus" actuators per surface-pair; "multiple path to data"

As is evident from the above (see FIG. 2 especially) this "flat armature" concept facilitates the use of one, or more, transducer assemblies per recording surface (pair). The evident reduction in actuator mass, cost, power, etc., will obviously encourage this. And workers will readily see advantages in such an "actuator-per-disk" array. For instance, no longer is it necessary to translate a heavy multi-transducer load, servicing "n" pairs of record surfaces, to shift one head on one surface! Also, while a first head is transducing, one (or several) other may, the-while, be shifted to a new address—thus avoiding wasted "access time" when the other head begins transducing (and the first ends).

This, in turn, facilitates a "multiple path to data" concept, whereby some, or all, tracks may be serviced by more than one head, and by more than one associated actuator—preferably having two heads per surface.

Such a "multi-ported" disk file concept is very schematically illustrated in FIG. 14, where one illustrative disk $D_n$ in a stack is shown to be comprised of 150 recording tracks—$t_1$, $t_{50}$, $t_{100}$ and $t_{150}$ being shown, in phantom, for illustration purposes. Certain groups of these tracks are to be serviced by a respective one of a trio of transducer heads $h_1$, $h_2$ and $h_3$, the heads to be actuated and controlled by appropriate mechanisms as known in the art (not shown here—it being understood that each of the disks D in a subject stack would be similarly provided).

Now, as indicated by the solid arrows, head $h_1$ is arranged to primarily service tracks $t_1$-$t_{50}$ (being positioned closely adjacent this group of tracks and normally reciprocated only across them—however being also adapted to be further translated to service tracks $t_{50}$-$t_{100}$ as a "backup" transducer. In a similar manner, head $h_2$ is disposed to primarily service tracks $t_{50}$-$t_{100}$, as well as arranged to also service $t_1$-$t_{50}$ as a "backup" to $h_1$ (and/or $t_{100}$-$t_{150}$; likewise head $h_3$ is adapted to principally service tracks $t_{100}$-$t_{150}$, while also optionally covering tracks $t_{50}$-$t_{100}$ (and/or $t_1$-$t_{50}$) as a "backup" head.

Thus, data along any particular track will have at least one alternate "port" (for data input/output), or transducer head arrangement for servicing it in case its primary transducer is unavailable (e.g., being busy elsewhere or damaged and inoperative, etc.). Thus, for example, head $h_1$ might be transducing on track $t_{49}$ and the current program call for track $t_{47}$ to be transduced next—in which case an optimized program could call head $h_2$ into service for this rather than head $h_1$ (assuming head $h_2$ was not otherwise occupied and was then available); thus head $h_2$ would be translated to track $t_{47}$ during the time $h_1$ was transducing on $t_{49}$. Quite evidentially this would avoid the "dead time" that would have resulted if head $h_1$ were used to service both tracks (avoid need to suspend data processing and input/output while $h_1$ was translated from $t_{49}$ to $t_{47}$). Workers will, of course, conceive of many other instances in which such "multi-head servicing" of data tracks is particularly advantageous. Also, it will be apparent that the aforementioned "flat armature" design for transducer-actuators is particularly apt for providing this.

Figure 9B:
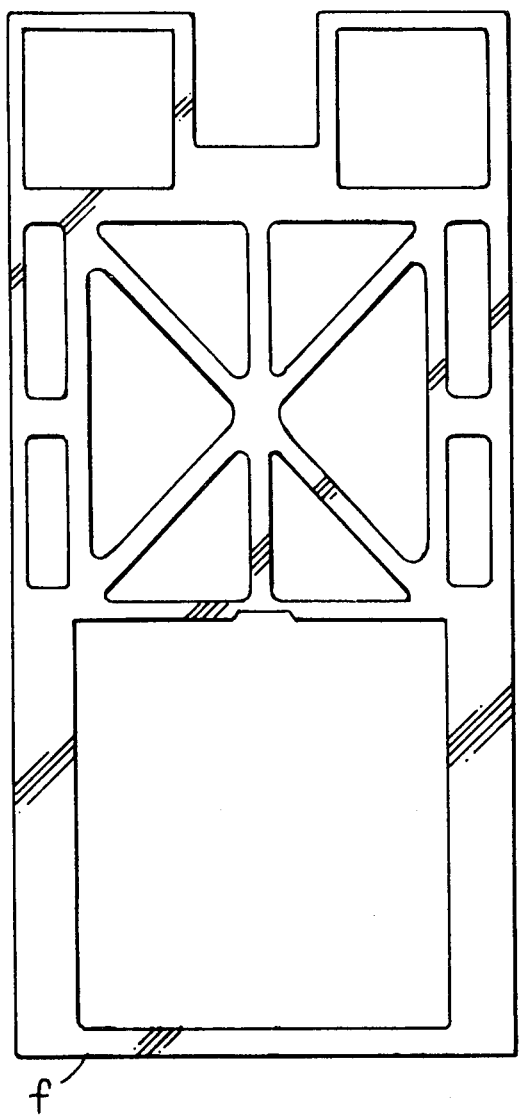
Figure 9C:
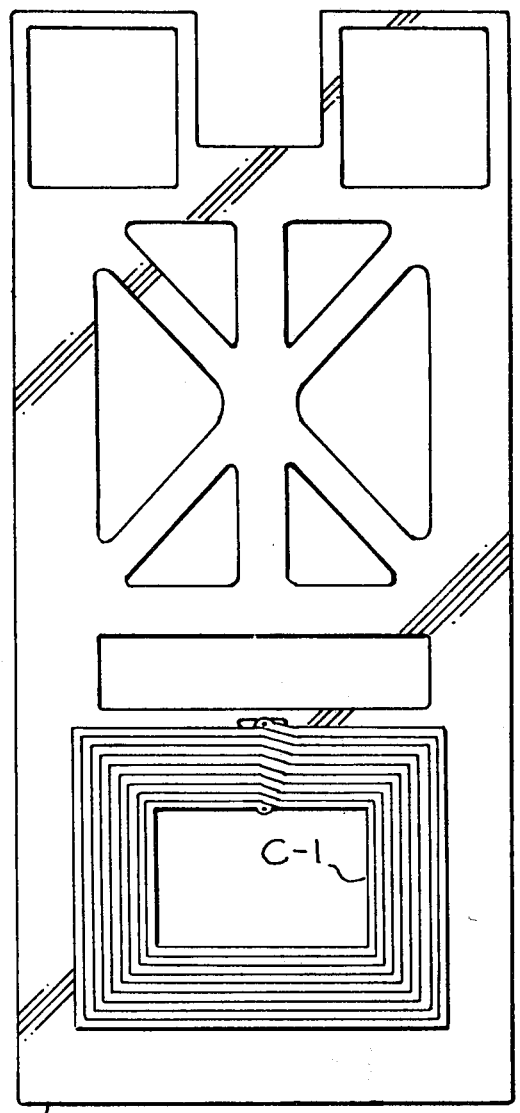
Figure 9D:
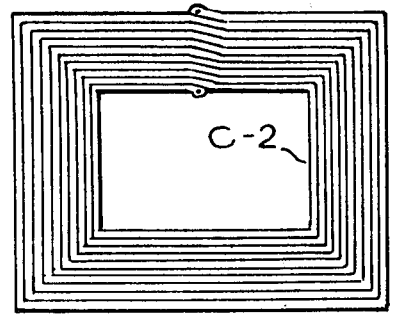
Figure 9E:
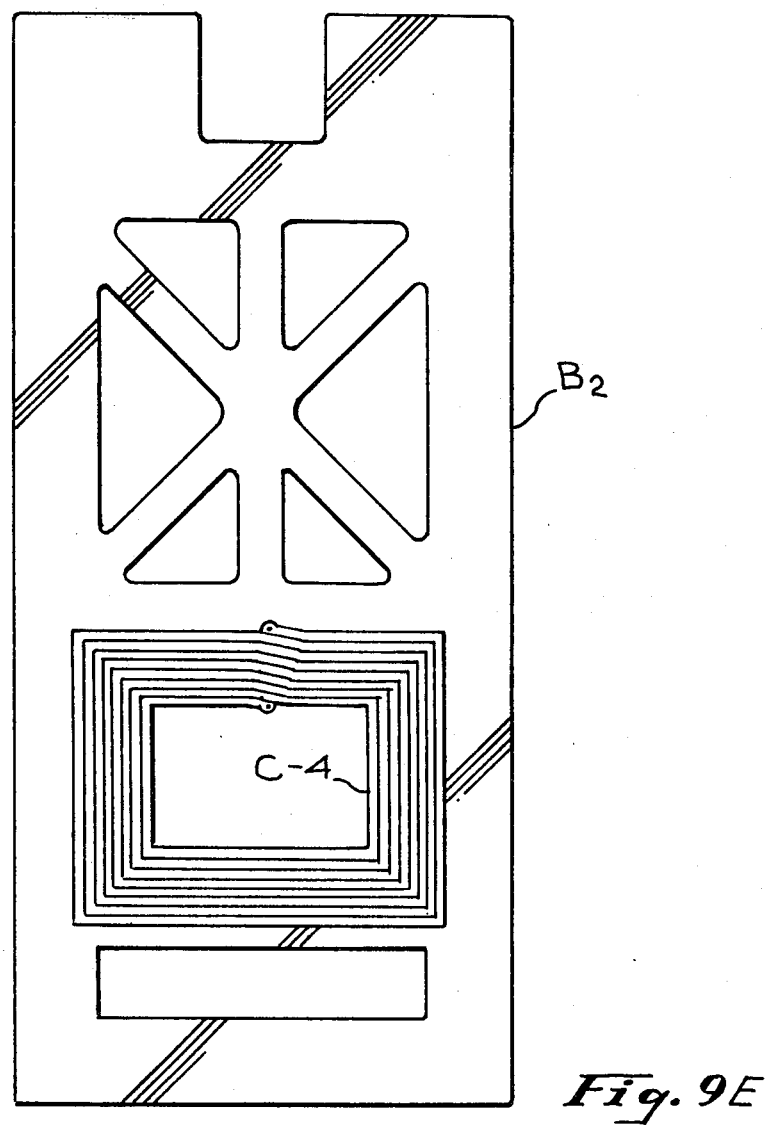
Figure 9F:
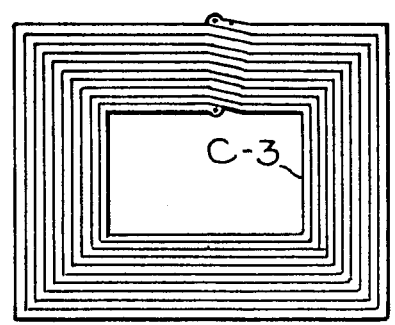
Figure 9A:
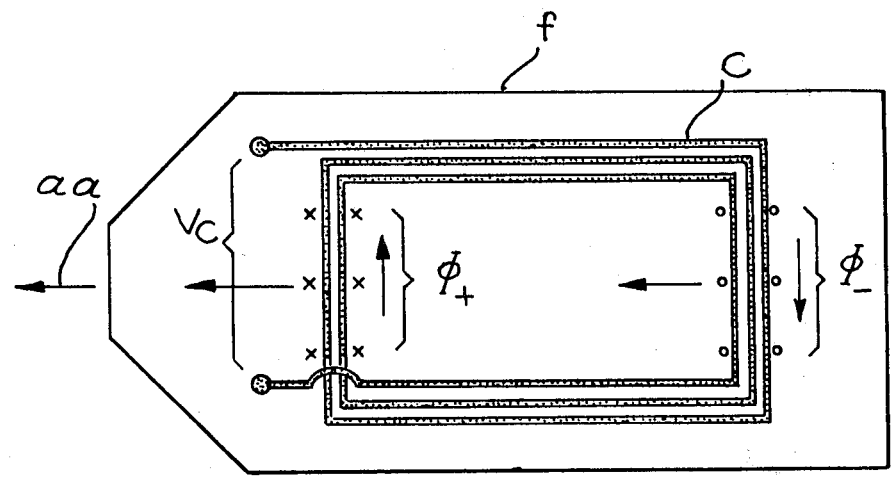
Figure 9A:
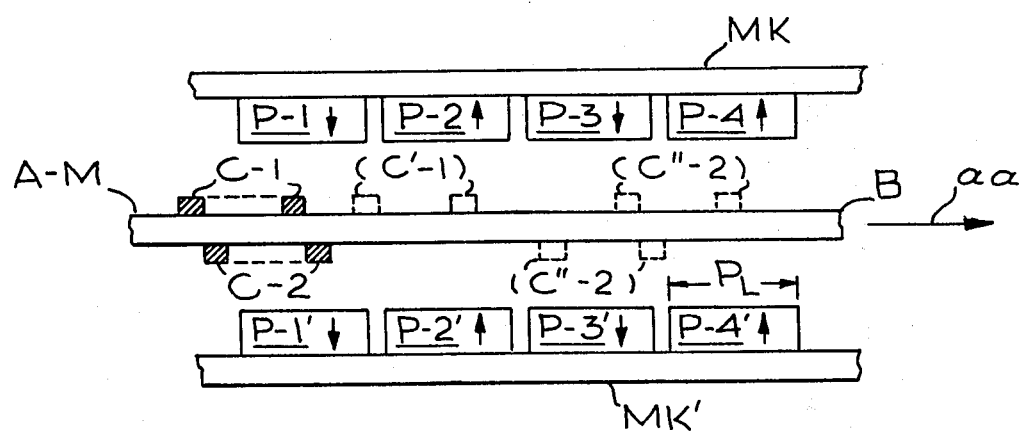

—Formation and Operation of flat coil armatures; FIGS. 7, 9A–9F and 9AA, 9AB:

A preferred construction and mode of assembly for flat coil armature embodiment A-m in FIG. 7 is indicated in a form of a layup in exploded view in FIG. 9A, with the several parts thereof being indicated in FIGS. 9B, 9C, 9D, 9E and 9F, while an operational representation is indicated in FIGS. 9AA and 9AB, FIG. 9AB also illustrating the preferred coil offset or overlapped relation.

More particularly, in FIGS. 9A and 9B will be seen an upper view of the frame f (of expoxy-glass, about 0.6 inches thick) to which the PC boards, coils, rollers and connectors, etc., are to be attached (for a non-ferrous metal may be used, preferably with all "rings" gapped with a dielectric). The structure and operation of these and other parts described will be understood as conventional, except as otherwise described. Frame f will be seen to be cut-out along its cross-section wherever possible (wherever the necessary rigidity and cross-sectional strength admit). A pair of PC boards, $B_1$, $B_2$ are to be placed respectively above and below frame f, each board carrying two pair of flat printed-circuit "overlapping" coils C (one on its top, the other on its bottom face) in opposed offset relation (though this is optional). That is dual-coils C-1, C-2 are disposed on the top and bottom of upper board $B_1$ and coils C-4, C-3 disposed atop and below the bottom PC board $B_2$. Opposed pairs of rollers r (bearings) support the frame for rolling reciprocation. A conventional head assembly (pair) is carried (not shown) along with associated electronics (e.g., see R/W chip 7-5). Flexible cables 7-3 couple the structure electrically to the outside and may include return-spring means.

In operation, and as very generally indicated in FIG. 9AA, each such flat coil C (only one coil shown for simplicity) will preferably comprise a multi-turn printed circuit exhibiting a rather advantageous mode of interaction with adjacent magnetic flux (intersecting the coil turns and emanating preferably from sets of surrounding permanent magnet poles as indicated in FIG. 9AB and elsewhere). Thus, once an energizing voltage $V_c$ is applied across the terminals to coil C, current will flow in the directions indicated by the arrows, and, with oppositely directed flux $\phi$ (indicated as $\phi_+$ and $\phi_-$ in FIG. 9AA), the actuation impulses will be additive, tending to thrust the overall structure f unidirectionally as indicated by arrow aa.

This is indicated rather diagrammatically in FIG. 9AB, where a flat coil armature A-m of the type described in the above embodiment is shown very schematically and in cross-section. Here, A-m includes a pair of opposed-offset coils C-1, C-2 disposed on opposite sides of a supporting board. Coils C-1, C-2 are identical and shown in schematic operative relation with a linear array of opposed permanent magnet pole pairs of the indicated polarity (see arrows). Each coil has an inner diameter ($C_{1D}$) approximating the common length ($P_L$) of any pole along the translation path (arrows aa), less a coil width ($C_w$)—i.e. $C_{1D} = P_L - C_w$. The pole pairs should be an even number and may, advantageously, extend virtually any distance with such a construction—a decided advantage over conventional actuators such as a VCM. Low reluctance shunt caps MK, MK' (e.g., of steel) help close the flux paths efficiently, minimizing the in-air flux-paths.

In operation, coil C-2 may be assumed to be energized with a certain drive current ($+i_d$) to begin translating armature A-m in the direction of arrow aa. When coil C-1 passes beyond the poles P-1, P-1' and reaches position C-1', or before, the current ($+i_d$) to coil C-2 is terminated and an opposite-polarity current pulse ($-i_d$) is sent through C-1 (while C-1 passes pole P-2, P2'). Coil C-1 then goes "quiescent" and C-2 is re-activated—and so on, until the armature reaches the end of this excursion (indicated here as the position of C"-1, C"-2—however, if less than "full power" is acceptable, the excursion may be extended somewhat in both directions, as workers know).

Workers will recognize many features of novelty in such a "flat linear actuator"; for instance, its thin planar cross-section (tailored to disk gap dimensions), the aligned magnet pairs, the overlapping coils.

Results:

Such a "flat armature" (printed circuit) actuator will be seen as advantageous by those skilled in the art, whether developed according to the above described embodiment or in a different related manner according to the subject teaching. Such a "flat actuator" is obviously apt for use in a "multi-actuator" array, with a plurality of actuators (and heads) available for each disk surface (or pair thereof)—i.e., with a plurality available per track as a preferable option. Such a "flat actuator" lends itself readily to the "multi-actuator" concept (e.g., as suggested in FIG. 1A) especially as opposed to existing designs.

Figure 10:
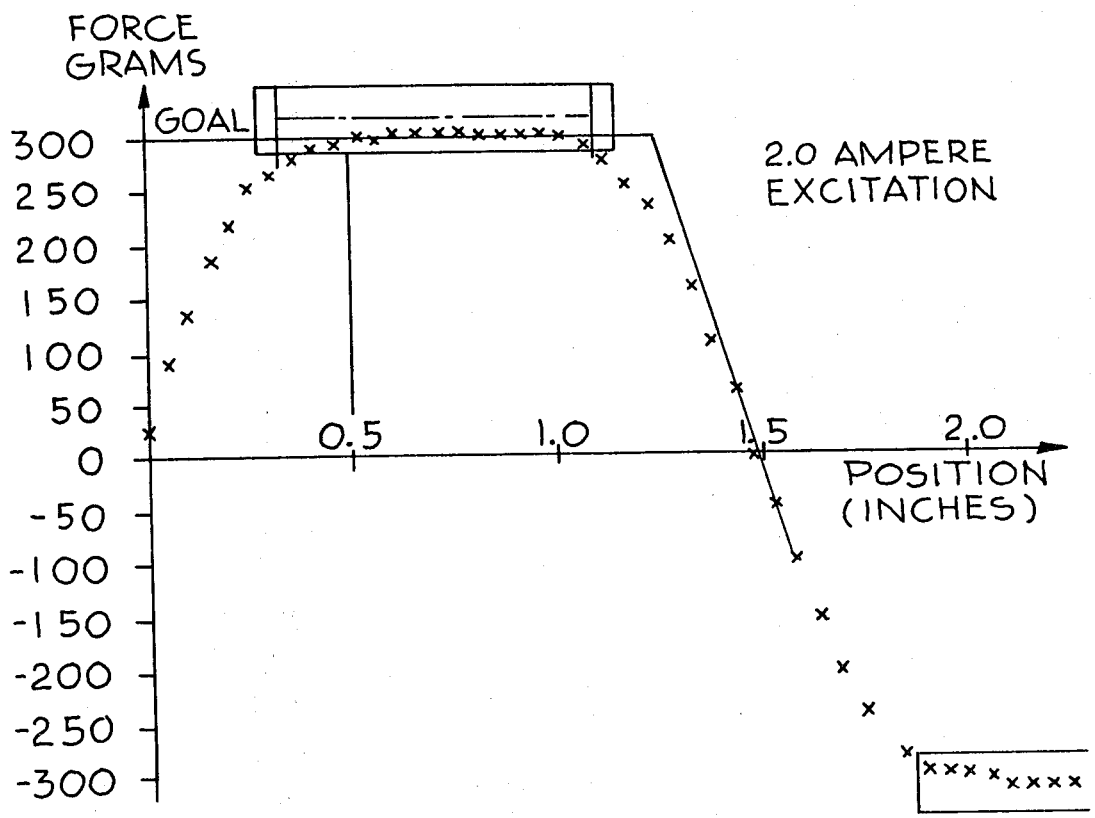
FIG. 10 is a plot of typical variations of actuator position with (magnetic) translational force.

As a qualitative example of the kind of results that can be achieved, consider FIG. 10, a plot of actuator force vs. head position for an actuator using (2.0 ampere excitation current). NOTE: a translational force of 250 to 300 grams is quickly developed and sustained to be relatively constant over a translation excursion of about 0.3 to 1.3 inches—the next cycle beginning about 1.5 inches wherein the second set of coils takes over.

Figure 12:
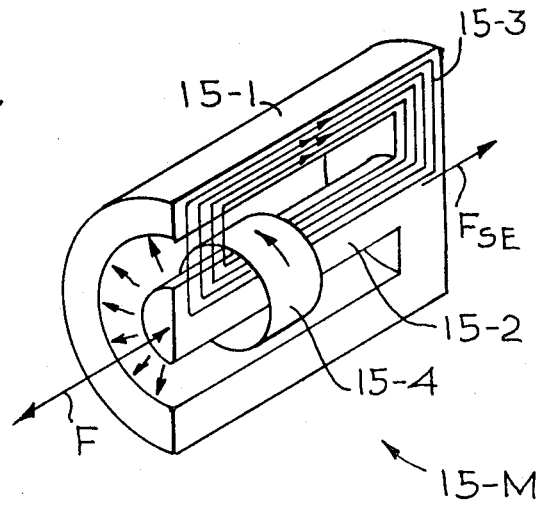

VC Actuators compared; FIGS. 12, 13:

FIG. 12 depicts, very schematically, a relatively conventional cylindrical solenoid 15-M (of the VC-M type, as in FIG. 11 also) comprising a permanent magnet source of magnetic flux comprised of a cylindrical, or semi-cylindrical, shell 15-1, with an inner core 15-2, core 15-2 being encircled by a moving solenoid coil 15-4. Coil 15-4 will be recognized as conventionally translated along core 15-2 when energized with current (due to inductive interaction with the magnetic flux—see arrows emanating between core 15-2 and peripheral magnet parts 15-1). Force arrow F indicates the resultant reciprocal translation forces so developed—the force direction being determined by direction of current through coil 15-4, as well known in the art.

The magnetic flux field set-up by coil current will flow mainly through the "path of least reluctance" (as indicated by flux loops 15-3 through magnet 15-M). I have found that "flat armature actuators" of the type described above operate somewhat differently. As indicated rather diagrammatically in FIG. 13, one may, simplistically, consider such "flat-armature" devices as comprised of a flat coil CCL (any number of turns) arranged to be energized and movable along a path between opposed magnet pairs, such as pairs A, B and C, in line. (Loop CCL here indicated as spanning section B and part of C). Considering the inductive energy stored in the air gap between these magnet poles, and intersected by the loops of coil CCL, the total energy in the system may be described as the sum of energy across segments A, B and C.

Now, if coil system CCL is moved "Forward" (in the direction indicated by the arrow, to the position CCL', shown in phantom), it will obviously span less of the working cross-sectional flux through segment C, while adding a corresponding amount from segment A, with that through segment B remaining unchanged. Thus, when the volumetric inter-gap flux densities are summed after such an incremental step, it will be found that the new energy is the same.

Hence, one can say that such movement of a "flat coil" armature involves no transfer of energy, unlike the "cylindrical actuators" indicated in FIG. 12 above. Workers will appreciate this advantage.

Alternate coil configurations; FIGS. 14, 15:

FIG. 14 indicates very generally, and in plan view, a pair of opposed-offset (overlapping) coils C-A, C-B, mounted on a "flat-armature" A-m and adapted to function in the manner of the above described embodiments. That is, the two opposed "end segments" of coil C-A (see arrows) are shown as relatively directly intersected by the flux of an adjacent pole pair (at this point in the translation cycle); while the end segments of companion coil C-B will intercept little or no such magnetic flux. Thus, one can say that coil C-A is "active", here; while coil C-B is now "quiescent" (during this portion of their excursion cycle). Thereafter, as the coils move and the flux leaves the confines of the C-A segments, it will begin to more directly intersect the end segments of coil C-B—then coil C-A will have turned "quiescent" and coil C-B become "active", to thereby maintain the driving force and continue the translation of armature A-m. Thereafter, upon further coil movement, coil C-A will again turn "active" and C-B "quiescent", etc., etc., as described above.

Workers in the art will perceive that while the "opposed-offset", overlapping printed coil construction indicated in described embodiments is rather advantageous and practical for many applications, there are other ways of implementing this concept and achieving similar results. One such alternate way is (very schematically) indicated in FIG. 15, (in the manner of FIG. 14). Here, a related "flat coil" armature A-m will be understood to include one or several adjacent coil "loops" L-1, L-2 shown for wires CC disposed thereon (as opposed to the "single-loop" coils C-A, C-B in FIG. 14, each of which is drawn about a common perimeter). As indicated in FIG. 15 each such printed circuit wire is to be extended along the actuation direction to define this "Multi-loop" version of such "flat armatures".

Coil-coupling variations; FIG. 16:

FIGS. 16A, 16A' show schematically (perspective and section respectively) a single coil (replicated each side) 2 layer construction wherein the (printed circuit) coils will be understood as "reverse-wound" and through-connected (C-a to C-b) at their centers. FIGS. 16B, 16B' are similar and show a variation: a "dual coil" (2 separate coils); single layer assembly wherein C-d and C-e are connected to separate input terminals.

FIGS. 16C, 16C' are similar and show another, highly preferred variation: a "dual coil/4 layer" assembly yielding eight coils effectively and deriving more turns per coil. (C-f through-connected to C-g at center; then C-g to C-m at ends; thence C-m to C-n at centers;

and C-h to C-j at centers; thence C-j to C-k at ends; thence C-k to C-l at centers).

Different magnet arrays; FIGS. 18:

FIG. 18A shows, schematically, a 4 magnet (2 opposed pair) actuator array comparable to that of FIG. 2. FIG. 18B similarly shows an 8-magnet (4 opposed pairs) array comparable to that of FIGS. 5 and 6—both having magnetic keeper plates, mk, mk' as above mentioned for flux conservation.

FIG. 18C shows three actuator compartments, each with a 6-magnet array (3 opposed pairs) plus a side-keeper sk for closing the magnetic circuit. Such an "odd pair" configuration is less preferable than "even-pairs" (multiples of 4 magnets preferred).

FIG. 18D is another variation comprising (for each actuator) a bi-functional array of magnets: one set of high-performance magnets (e.g., rare-earth/cobalt magnets M-RC) for "normal" fast operations, over a normal excursion; plus a second set of inexpensive, low-performance magnets (e.g., ceramic magnets M-C) for exceptional or emergency operations. For instance, as used in a "dual path-to-data" disk drive, as noted above, such actuators would be understood as normally operating over a short (e.g., 50 track) excursion—this defined by high strength expensive magnets M-RC. But for optional occasional use, over an extended stroke (e.g., 100 tracks, when companion actuator is "busy" or "disabled"), the actuator (coils) would travel beyond the region M-RC into that of magnets M-C as well. For such occasional, emergency operations the degraded performance to be excepted with magnets M-C (e.g., slower translation) is acceptable, and justified by the cost-savings.

Various actuator-stack configurations; FIG. 19:

FIG. 1B shows schematically, a 4-compartment stack, for four "flat coil" actuator units, with top and bottom flux-shunt plates. Compare the 7-compartment unit of FIG. 19A and the 8-unit array of FIG. 19B and 19C. FIG. 19B really combines two 4-unit modules as in FIG. 1B; but in 19C the (redundant) center shunting plates (mk", mk"') are eliminated, with reduction in height, weight and cost, but no sacrifice in performance.

Multi-arm "flat coil" actuator; FIG. 20:

FIG. 20 shows in very schematic perspective, a variant use of the "flat coil actuator" of the invention. Here, a plurality of arms (3 shown, number optional): aa-1, aa-2, aa-3 are shown all mounted in common from a single "PCB coil" actuator comprising broad A-1 with coils (C, etc.) as before indicated. Large permanent magnet plates M-I, M-II surround the (coil portion of) board A-I and are adapted to cause it to reciprocate (arrow c-o) when the coils are energized, as before. This will, of course, drive associated head assemblies to a prescribed common position adjacent respective disk surfaces (D-1, D-2, D-3).

However, according to a related feature board A-I is mounted and arranged (by conventional means, not shown) to also be reciprocated vertically (arrow v-d) by conventional means (not shown).

Figure 23:
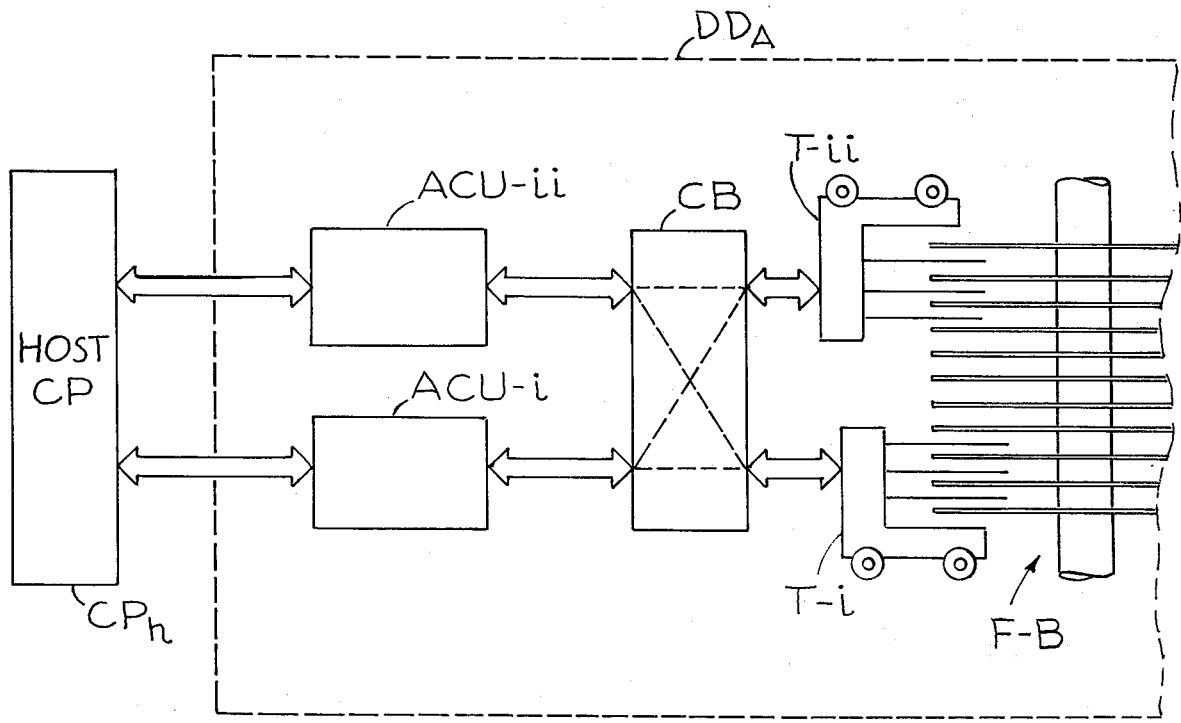
FIG. 23 shows an array similar to that in FIG. 21 together with a novel "cross-coupled" actuator control embodiment shown in block diagram form.

"Cross-bar" feature:

According to another feature of invention, another way of providing "multi-path to data" and "Soft-failure" capability (besides the "multiple actuator per face" implementation indicated above) is to provide the "cross-bar" feature for a disk drive system, e.g., as very schematically indicated in FIG. 23.

FIG. 23 may be viewed as very schematically indicating a fixed disk drive unit $DD_A$ including a disk file F-B, similar to those discussed above and shown in FIGS. 21 and 22, being adapted to provide memory and be controlled by at least one host computer $CP_h$. Disk drive unit $DD_A$ will be understood as conventional according to present good practice except where otherwise specified herein. Disk file F-B will be understood as comprising a plurality (two shown) of multi-arm transducer actuator arrays T-i, T-ii, each array being coupled via an associated actuator control stage (A-CU-i, A-CU-ii, respectively) to a host computer $CP_h$, being coupled thereto however according to the novel "cross-bar" feature (stage CB) further described below.

Figure 21:
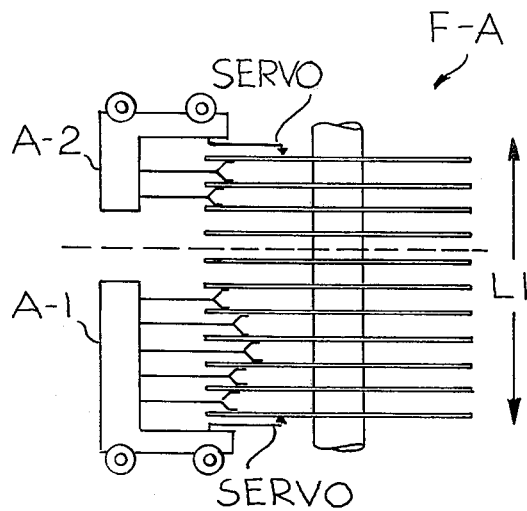
Figure 22:
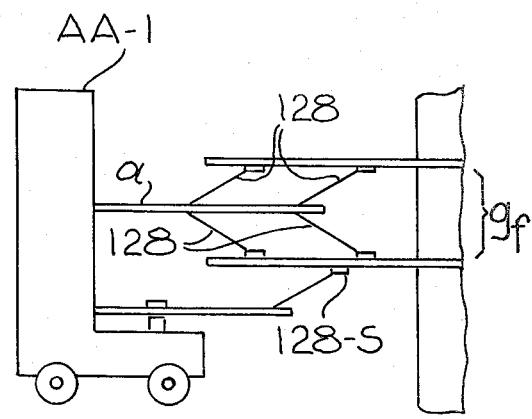
FIG. 22 is a similar view showing one such actuator.

Such a two-actuator file is relatively conventional like file F-A in FIG. 21, wherein the lower set of disks d are understood as accessed by associated arms and heads projecting in common from a lower actuator carrier A-1, while the upper disks d are similarly accessed by an associated upper carrier A-2. Each actuator array will, typically, also have a conventional servo arm and head as indicated, for instance in FIG. 21 and at 128-S in FIG. 22. FIG. 22 also suggests that each arm a may carry (1 or) two pairs of transducer heads 128, one head in each pair being presented to a respective one of the two opposing disk faces in each subject file-gap $g_f$. Thus, for instance, in the preferred embodiment of FIG. 23, file F-B may comprise a pair of head-actuators T, each of which presents five actuator arms, each arm having two pairs of opposed transducer heads and being projectible into one of the five associated gaps, as known in the art.

Disk Drive embodiment $DD_A$ including "cross bar" stage CB will be understood as adapted to prevent "Hard", or catastrophic, electronic-control failure of the disk drive and the associated EDP system,—i.e., failure relative to "actuator electronics" (i.e., any electronic failure which impairs the actuator electronic supply-control means, such as the failure of a power amplifier or power supply in one of the control stages, A-CU, or the failure of an associated fuse, transformer, electronic packaging element, as understood by workers in the art—such being known by some as the most frequent cause of EDP "Hard" failure; the next most frequent being actuator motor failure). In one mode, such a failure, resulting in shut down of the drive unit, will automatically result in the switching-in of another ("live") electronic-control stage (substitution for the "dead" one) and the resumption of drive operation.

Thus, this "cross-bar" feature allows one of the two electronic data paths associated with each of several disk file modules to be reconfigured so that they can access one another's actuators. For instance, if any electronic element (e.g., in electronic supply-control stage A) along one data path (path A) fails, the entire associated file would "go down" ordinarily so that the computer system would be blocked from access to the associated data (cf actuator A associated with this file A would be rendered inoperative).

But with this "cross-bar" feature actuator A (and file A) can be "revived" by cross-coupling to the electronic control stage B of the companion file B—and so recoupled to the host CP, etc.

Likewise, of course, if control stage B fails its associated file and actuator can be "revived" by connection with companion control stage A in similar fashion. The net result of this is that the system is relatively tolerant of electronic failure in either data path, the files in each data path being adapted to so "share" control stages.

As a result of such "cross-bar" implementation a "Hard" failure can be turned "Soft"; thus, should one of the control units A-CU fail for any reason, the host CP$_h$ may for instance be programmed and arranged to induce switching, via cross-bar stage CB, to link the other control unit A-CU to the concerned actuator T (the software routine may act as the controller in this case through known programming techniques associated with such hardware). Workers are well aware of the means of effecting this.

The significance of such a "cross-bar" implementation will be apparent to those skilled in the art; and it will be apparent that such may be used for many different kinds of fixed disk drives rendering them less susceptible to "Hard" failure, invoking instead a "Soft" failure, using the "multiple path to data" approach. Workers will see other incidental advantages to providing this "cross-over" capability. For instance, in the inspection test, checkout, etc. of the disk drive, a field engineer can pull or otherwise disable one of the two actuator control units A-CU, yet still keep the DD "on the air" by simply invoking the cross-over feature whereby the other control unit A-CU is made to handle the load during this test sequence. Workers will visualize other like applications and see how powerful a tool this "cross-over" capability is.

Workers will also appreciate how simply and inexpensively this "cross-over" feature can be implemented, while yet preventing one of the most common, expensive sources of "Hard" failure in a DD. Such a solution can, for instance involve $10–20. added cost in a typical DD unit, while all but eliminating "Hard" failure from electronic sources and greatly increasing the MTBF of the unit (e.g., from a few 1000 hours to the order of ten times that level—then, due to motor failure). Workers will appreciate how powerful this cross-over feature is, yet how simple and inexpensive to implement.

Figure 24:
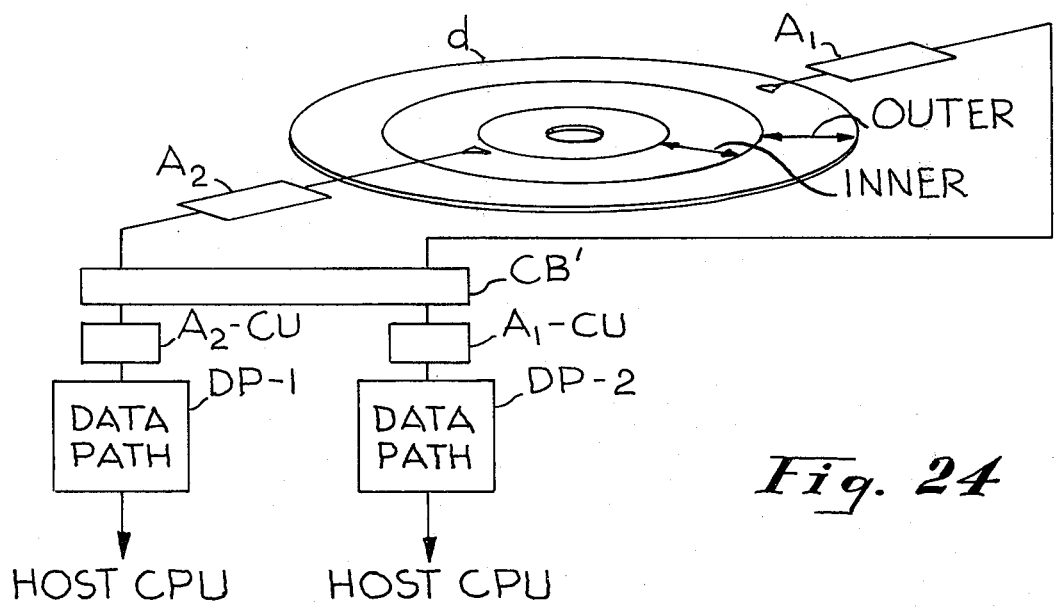
FIG. 24 is a schematic showing of a single recording disk indicated as accessed by a pair of complementary "cross-coupled" transducer-actuator means.
Figure 25:
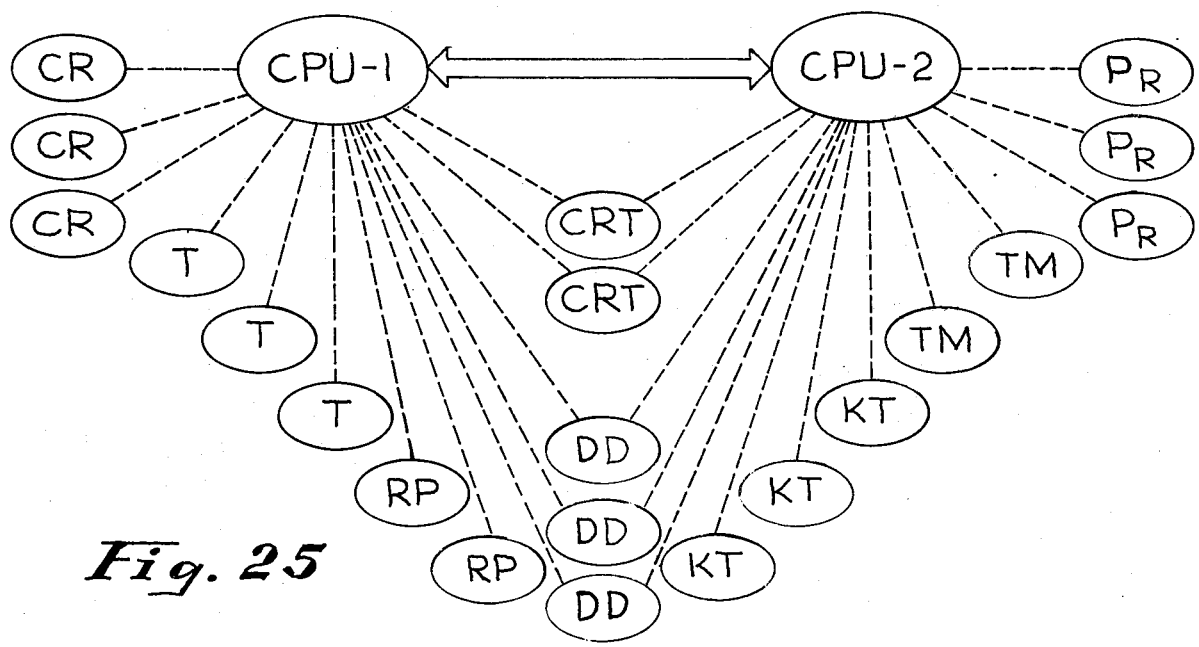
FIG. 25 is an idealized block diagram, showing an EDP system with co-operative clusters of different terminal units.
Figure 26:
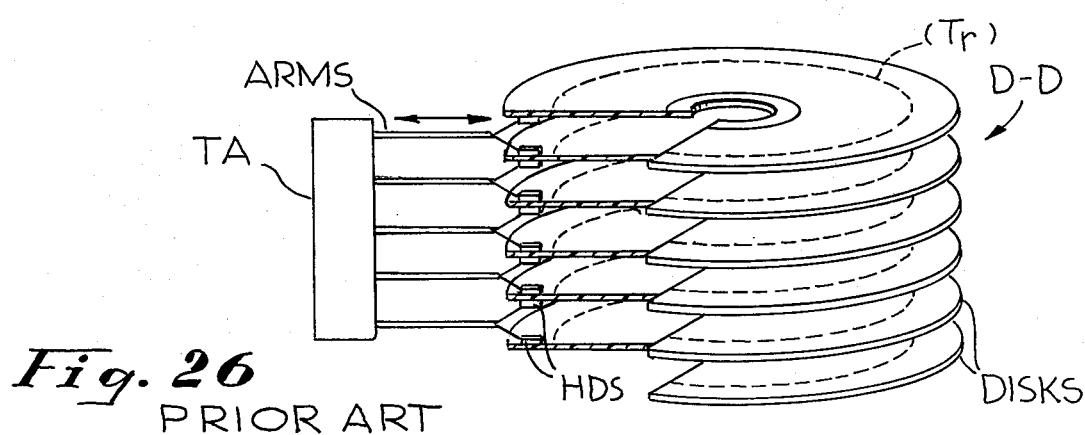
FIG. 26 is a schematic partial elevation, after the manner of FIG. 21, however showing a Prior Art disk pack.

Combining "cross-bar" with "overlapping actuators"; FIG. 24:

It was mentioned that this "cross-bar" feature can of course, be combined with the multiple overlapping actuator (per recording face) feature previously mentioned; such a combination is shown very schematically in FIG. 24. Here, in a much simplified representation, a single recording face of exemplary disk d is shown as "normally covered" by a pair of associated magnetic transducer heads and related actuator stages A-1, A-2, with one unit (A-1) covering the outer span of tracks and the other unit (A-2) covering the inner span (each unit is also arranged to additionally cover the other span of tracks in its "emergency mode", as mentioned above).

The output from the two actuator units is sent to a host CPU along an associated data path (DP-1, DP-2) and via an associated control electronics stage (A1-CU, A2-CU), via a common "cross-bar stage" CB' of the type described above in FIG. 23. Thus it will be apparent that for instance, should control stage A1-CU fail, the host CP (or other means) can automatically direct the substitution of other control unit A2-CU to handle actuator A-1—this being the "emergency mode" for A-CU-2, which will also be handling its normal responsibilities on the inner tracks. In this fashion, there is provided a "multiple path to data" from the CPU to the recording tracks on disk d.

Conclusion:

Workers will appreciate how such a "cross-bar" feature can thus provide "Soft failure" and a "multiple path to data" capability in a fixed disk drive. In particular they will appreciate how such a disk drive may be provided with two or more actuator arrays, each with an associated control stage, and how these control stages may be cross-switched and "shared", via an intermediate "Cross-bar" stage, to provide these results at relatively simple cost and using simple state-of-the-art implementation.

Workers will further appreciate how such a "multiple path to data" and "Soft failure capabilities" are rendered using multiple actuators per recording tracks, especially as combined with the mentioned "cross-bar" feature.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other disk drive units (e.g., Mass Memory therefrom). Also, the present invention is applicable for providing the positioning required in other related recording and/or reproducing systems, such as those in which data is recorded and reproduced optically (optical transducers replacing the described magnetic ones).

The above examples of possible variations of the present invention are merely illustrative. Accordingly, the present invention is to be considered as including all possible modifications and variations coming within the scope of the invention as defined by the appended claims.

What is claimed is:

1. An improved disk drive arrangement arranged to be controlled by one or more computer means and including a disk file, this file being characterized by two or more transducer arrays with each array coupled in a respective electronic data channel to at least part of said computer means via an associated control stage, the improvement therein comprising:

cross-bar means coupled between each said transducer means and all of the control stages, and adapted to inter-couple each transducer means with an associated respective control stage in a first "normal" mode while also being adapted to couple each said transducer means to at least one other control stage in an "emergency mode";

whereby this system is arranged so that if one of the said electronic data channels to the computer means is interrupted it may be reconfigured along an alternate "emergency path" by said cross-bar means, to thus afford a "soft failure" and "alternate path to data" capability in the arrangement.

2. The arrangement as recited in claim 1 wherein said cross-bar means is arranged so that if any transducer means should fail the cross-bar means is controlled to automatically substitute alternative transducer means, in certain cases and/or it is arranged so that if any transducer control stage should fail, the cross-bar means is automatically controlled to substitute an alternate control stage, whereby the said transducer means are arranged to "share" control stages.

3. A disk drive arrangement including at least two groups of disks, each disk having at least one recording face presenting a plurality of recording track sites arranged concentrically thereon; plus associated actuator means and actuator control means for each said disk group, each actuator and actuator control means being adapted for communication along an associated channel between a prescribed central data processor means (CP) and any "selected" disk track in its associated group, the improvement therein comprising:

common "switch means" interposed between each disk group and its associated "channel" and adapted to "normally" intercouple these whereby to establish a "normal path to data";

this switch means also being adapted to "cross-couple" any said channel in case of failure of an electronic or mechanical actuator component therein, whereby a companion channel is substituted automatically for the "failed channel" to thereby provide for "Soft-failure" via an "alternate path to data" capability.

4. The combination as recited in claim 3 wherein some or all tracks are so arranged for "multiple-overlapping actuator servicing" whereby the actuator means includes at least two actuator arms for each concerned track, each arm being adapted to present transducer means covering one or both recording faces defining the interdisk gap.

5. The combination as recited in claim 3 wherein the electronic-control means is adapted to be automatically shifted from its respective normal data path to an alternate data path and thereby coupled with another actuator means, responsive to detection of interruption in that normal data path.

6. The combination as recited in claim 3 wherein multiple actuator means are provided for each recording face, or opposed pair of faces, each actuator means covering a different respective designated span of track-sites, normally, and also being arranged and controlled to cover an adjacent "alternate" span of track-sites in an emergency operating mode.

7. An improved method for arranging a disk drive to be controlled by one or more computer means, this drive including a disk file, this file being characterized by two or more transducer arrays with each array coupled along a respective electronic data channel to at least part of said computer means via an associated control stage, the method comprising:

interposing cross-bar means between each said transducer means and all of the control stages, and intercouple the cross-bar means between each transducer means and its respective control stage to thereby establish a first "normal" communication channel therefor;

while also adapting the cross-bar means to automatically couple each said transducer means to at least one other control stage as an "emergency channel" under prescribed "emergency conditions";

whereby this drive, then, operates in a "soft failure" mode so that if one of the said channels to the computer means is interrupted, such alternative connection will be automatically reconfigured along said alternate "emergency channel" by said cross-bar means, thus establishing an "alternate path to data" capability for the drive.

8. The method as recited in claim 7 wherein said cross-bar means is arranged so that if any transducer means should fail, the cross-bar means is controlled to automatically substitute alternative transducer means, in certain cases and/or it is arranged so that if any transducer control stage should fail, the cross-bar means is automatically controlled to substitute an alternate control stage, the said transducer means thus being arranged to "share" control stages.

9. The method of claim 7 wherein each drive includes at least one disk stack, each stack being accessed by a plurality of transducer-actuator arrays, each actuator array being controlled by a respective control stage, all the control stages being selectively "cross-coupled" to at least one other actuator array via a common intermediate "cross-bar" stage which thus provides the "alternate path to data" in event of failure of a given control stage or of a given transducer-actuator array.

10. The method as recited in claim 7 also including the steps of providing multiple actuator means for each recording disk face, or opposed pair of faces; and of adapting and arranging each actuator means to "normally" cover a different respective set of track-sites on the selected disk-face; and of also arranging and controlling them to cover an adjacent "alternate" set of track-sites in an "emergency", or "assist", operating mode.

11. A fixed disk drive including at least one stack of disks, each disk therein having at least one recording face presenting a plurality of recording track sites arranged concentrically thereon, together with associated actuator means and actuator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substituted for the failed component to thereby provide for "Soft-failure" via an "alternate path to data" capability;

wherein are provided a plurality of actuator means for the disk file plus an associated actuator control stage for each actuator means, and, intermediate these, a common "cross-bar stage" adapted to substitute another control stage and thus provide an "alternative path to data" while the failed control stage is inoperative, responsive to indication of failure in any control stage.

12. A fixed disk drive including at least one stack of disks, each disk therein having at least one recording face presenting a plurality of recording track sites arranged concentrically thereon, together with associated actuator means and acutator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substitued for the failed component to thereby provide for "Soft-failure" via an "alternate path to data" capability;

wherein the drive comprises one or more actuator control stages, each coupled to respective actuator arrays; and where, in event of failure in any control stage along any given "normal data path", the drive is adapted to automatically substitute an alternate control stage and/or an alternate actuator array and so define an "alternate data path" and so maintain the system in operation and avoid "Hard" failure.

13. A fixed disk drive including at least one stack of disks, each disk therein having at least one recording face presenting a plurality of recording track sites arranged concentrically thereon, together with associated actuator means and actuator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substituted for the failed component to thereby provide for "Soft-failure" via an "alternate path to data" capability;

wherein each disk group is accessed by a first and second transducer-actuator array; each being controlled by a respective first and second control stage with the control stages being selectively cross-coupled to the other actuator array via common intermediate "cross-bar" stage which thus provides an "alternate path to data" in event of failure of a given control stage.

14. A fixed disk drive including at least one stack of disks, each disk therein having at least one recording face presenting a plurality of recording track sites arranged concentrically thereon, together with associated actuator means and actuator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substituted for the failed component to thereby provide for "Soft-failure" via an "alternate path to data" capability;

wherein each disk stack is accessed by a first and second transducer-actuator array; each being controlled by a respective first and second control stage with the control stages being selectively cross-coupled to the other actuator array via common intermediate "cross-bar" stage which thus provides an "alternate path to data" in event of failure of a given control stage.

15. A fixed disk drive including at least one stack of disks, each disk therein having at least one recording face presenting a plurality of recording track sites arranged concentrically thereon, together with associated actuator means and actuator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substituted for the failed component to thereby provide for "Soft-failure" via an "alternate path to data" capability;

wherein a number of disk faces are provided in a stack of identical disks, each face presenting "$S_1$ through $S_n$" track sites, there being $T_1$-$T_n$ associated separate transducer/actuator arrays, each array arranged and adapted to cover a different unique set of adjacent track sites in its "normal operating mode"; and also being arranged and adapted to cover an adjacent set of track sites in a prescribed "emergency operating mode".

16. The combination as recited in claim 15 wherein each transducer/actuator array is also arranged and adapted to cover both a "principle set" of track sites and also to cover one, or two, "alternate sets" of track sites, each such "alternate track set" being disposed adjacent the "principle set"; and wherein each array is provided with "primary" drive means adapted to service said track sites in the "normal operating mode" plus "secondary" drive means arranged to service said "alternate sets" in said "emergency mode" of operation.

17. The combination as recited in claim 16 wherein the track coverage among the several transducer-actuator arrays is arranged to so "overlap" as to provide at least one alternate, back-up transducer/actuator array for each track site.

18. A fixed disk drive including at least one stack of disks, each disk therein having at least one recording face presenting a plurality of recording track sites arranged concentrically thereon, together with associated actuator means and actuator control means adapted for communication between a prescribed central processor means (CP) and any such track which is "selected", where any given normal connection between the CP and a given track via the control means may be characterized as the "normal path to data", the improvement therein comprising:

means adapted to vary this "normal path to data" in case of failure of an electronic or mechanical actuator component, whereby a like component in the system is arranged to be automatically substituted for the failed component to thereby provide for "Soft-failure" via an "alternate path to data" capability;

wherein each disk stack is accessed by a first and second transducer-actuator array; each being controlled by a respective first and second control stage with the control stages being selectively cross-coupled to the other actuator array via common intermediate "cross-bar" stage which thus provides an "alternate path to data" in event of failure of a given control stage.

* * * * *

UNITED STATES PATENT AND TRADEMARK OFFICE
CERTIFICATE OF CORRECTION

PATENT NO. : 4,423,448

DATED : December 27, 1983

INVENTOR(S) : Jorgen Frandsen

It is certified that error appears in the above-identified patent and that said Letters Patent is hereby corrected as shown below:

Col. 2, line 60, change "equation:" to --question:--.

Col. 4, line 34, change "(CUP-1, -2)" to --(CPU-1, -2)--.

Col. 17, line 48, change "broad" to --board--.

Col. 22, line 48, change "acutator" to --actuator--.

Signed and Sealed this

Twentieth Day of March 1984

[SEAL]

Attest:

Attesting Officer

GERALD J. MOSSINGHOFF

Commissioner of Patents and Trademarks